US006967908B2

(12) United States Patent
Ogasawara et al.

(10) Patent No.: US 6,967,908 B2
(45) Date of Patent: Nov. 22, 2005

(54) OPTICAL PICKUP DEVICE WITH FOCUS ERROR DETECTING OPTICAL ELEMENT AND METHOD FOR FOCUS ERROR DETECTION

(75) Inventors: Masakazu Ogasawara, Tsurugashima (JP); Hajime Koyanagi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 309 days.

(21) Appl. No.: 09/944,098

(22) Filed: Sep. 4, 2001

(65) Prior Publication Data

US 2002/0048233 A1 Apr. 25, 2002

(30) Foreign Application Priority Data

Sep. 7, 2000 (JP) ....................................... 2000-272090
Sep. 7, 2000 (JP) ....................................... 2000-272091

(51) Int. Cl.[7] .................................................. G11B 7/00
(52) U.S. Cl. ................................ 369/44.42; 369/44.23; 369/44.37; 369/44.41; 369/112.17; 369/124.12
(58) Field of Search ........................... 369/44.42, 44.23, 369/44.37, 44.41, 112.17, 124.12, 120

(56) References Cited

U.S. PATENT DOCUMENTS 4,464,741 A * 8/1984 Compaan ................. 369/44.23
4,793,696 A * 12/1988 Suh ............................ 359/223
4,794,580 A * 12/1988 Ikedo et al. ............. 369/44.16
4,815,027 A * 3/1989 Tokumitsu et al. ......... 708/835
4,847,478 A * 7/1989 Sugiura ................... 250/201.5
4,959,824 A * 9/1990 Ueda et al. .............. 369/44.14
5,331,622 A * 7/1994 Ernst et al. .............. 369/112.2
5,359,184 A * 10/1994 Froehlich et al. ........... 235/454
5,963,316 A * 10/1999 Miura et al. ............. 356/237.3
6,057,953 A * 5/2000 Ang ........................... 359/204
6,212,150 B1 * 4/2001 Inoue et al. ........... 369/112.04
6,418,098 B1 * 7/2002 Yamamoto et al. ...... 369/44.41
6,445,668 B2 * 9/2002 Sugiura et al. ........ 369/112.12
6,584,060 B1 * 6/2003 Oohchida et al. ...... 369/112.05

FOREIGN PATENT DOCUMENTS

JP 8-185635 7/1996

* cited by examiner

*Primary Examiner*—Gautam R. Patel
(74) *Attorney, Agent, or Firm*—Morgan Lewis & Bockius LLP

(57) ABSTRACT

An optical pickup device for focusing a light beam includes a focus error detecting optical element which splits and leads return light to a photodetector. The focus error detecting element has an area quadrisected by two division lines defining a plane substantially perpendicular to the optical path of the return light for applying astigmatism to the return light in directions rotated by 90° from each other and for separating the return light into at least four by the respective quadrants. The photodetector has a plurality of spaced light receiving elements for receiving the separated return light, each receiving element has contour lines corresponding to the division lines on an image plane on which a light beam is shaped into a circular beam. The light receiving elements are comprised of two light receiving areas divided by a bisect line extending substantially in parallel with one of the contour lines.

20 Claims, 26 Drawing Sheets

FIG. 3B (FAR)
PRIOR ART

FIG. 3A (FOCUSED)
PRIOR ART

FIG. 3C (NEAR)
PRIOR ART

FIG. 13C (FAR)

FIG. 13A (FOCUSED)

FIG. 13E (NEAR)

FIG. 22C
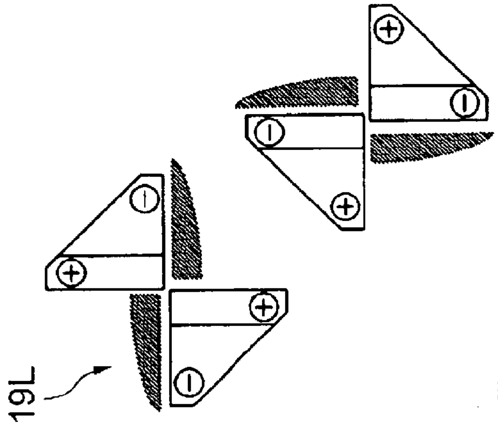
FIG. 22B
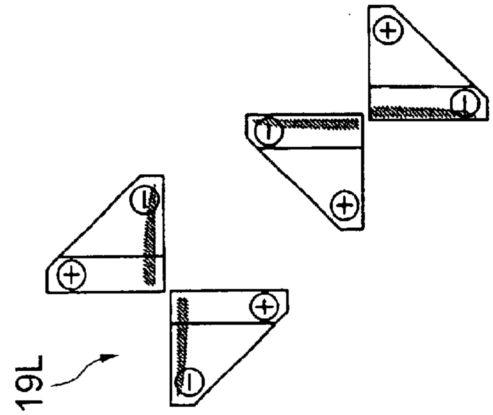
FIG. 22A
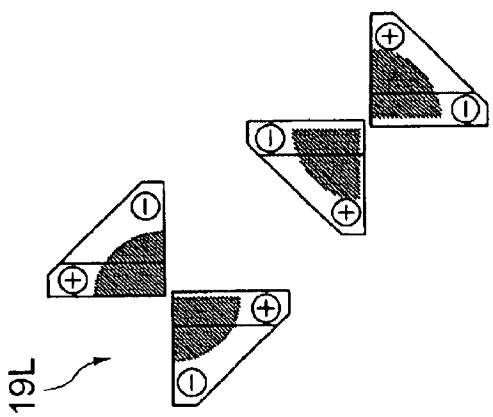
FIG. 22D
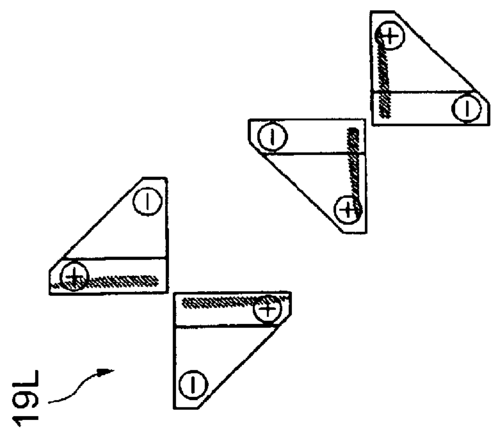
FIG. 22E
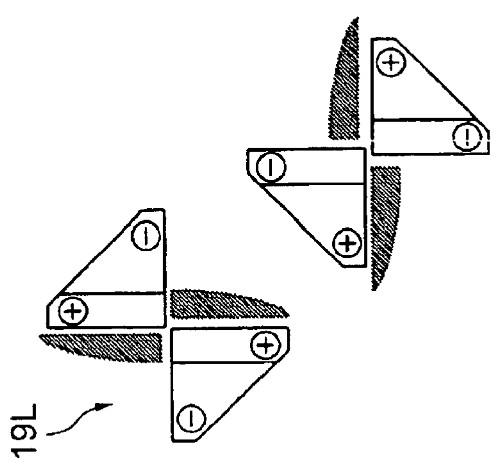
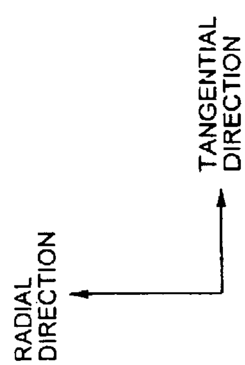

FIG. 24C
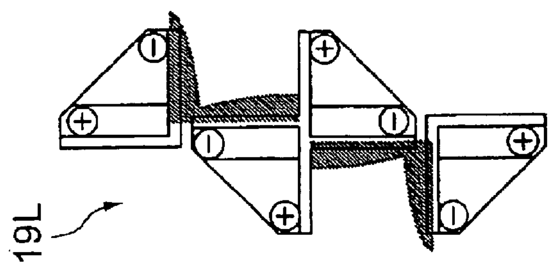
FIG. 24B
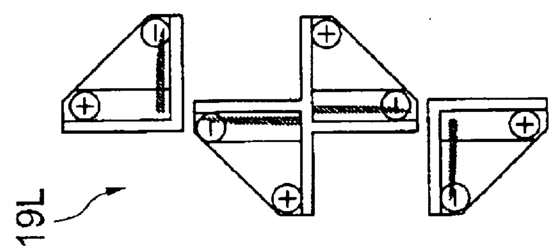
FIG. 24A
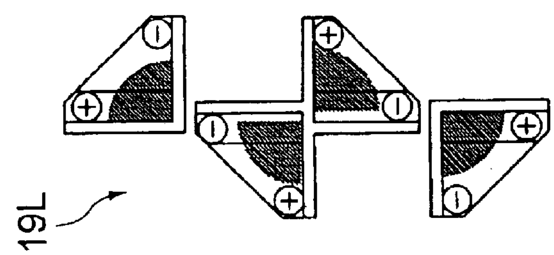
FIG. 24D
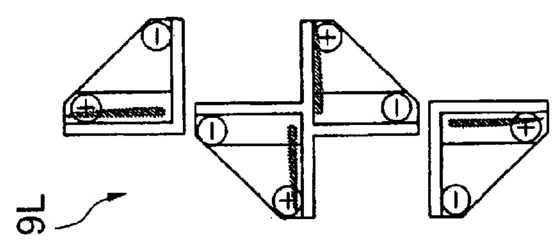
FIG. 24E
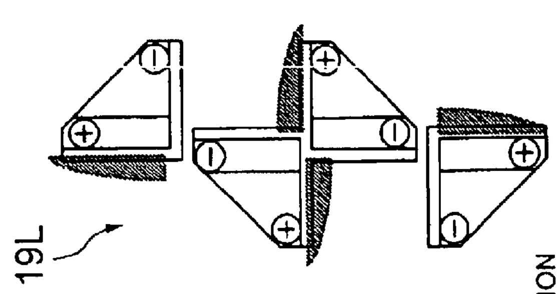
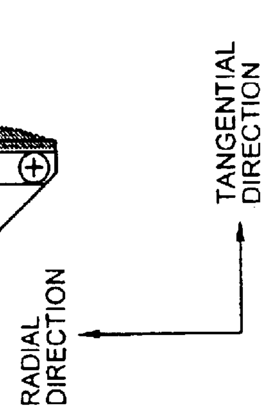

OPTICAL PICKUP DEVICE WITH FOCUS ERROR DETECTING OPTICAL ELEMENT AND METHOD FOR FOCUS ERROR DETECTION

BACKGROUND OF THE INVENTION

1. Field of the Invention

The present invention relates to an optical pickup device for use in an optical information recording/reproducing apparatus which uses a light beam to write and read an information signal into and from an optical information recording medium such as an optical disk.

2. Description of the Related Art

An optical pickup comprises an irradiation optical system including an objective lens and an optical detecting system for focusing a light beam irradiated from a light source on a sequence of pits, a track or the like formed spirally or concentrically on an information recording surface on one side of an optical disc such as CD (Compact disc), CD-ROM and DVD (Digital Versatile Disc) to form a spot thereon, and read recorded information such as music and data from return light reflected back from the information recording surface of the optical disc, or for writing recording information on a track or the like.

In the optical pickup, so-called focus servo and tracking servo for an objective lens are essential for securely writing information on an optical disc or securely reading information from the optical disc. The tracking servo control is a position control in a radial direction on an optical disc with respect to a track, over which the objective lens is positioned, for irradiating a light beam to a recorded location (for example, a track) on an information recording surface of the optical disc at all times. The focusing servo control is a position control in the axial direction of the objective lens for minimizing a positional error in the axial direction (focusing direction) of the objective lens with respect to a focused position of the objective lens such that the light beam is converged at the recorded location in the form of spot.

Known focusing servo control methods include, by way of example, a spot size method which divides light into two optical paths in an optical system of return light, focuses one of light beams on a front detector while focuses the other light beam on a rear detector, and compares the sizes of light spots on the front and rear detectors, and an astigmatic method which employs a cylindrical lens, a parallel flat plate and so on positioned in an optical system of return light, receives the return light on a quadrant detector, and detects the shape of a light spot on the detector.

The spot size method requires an optical pick up of a large size as a whole since return light must be divided, whereas the astigmatic method readily calculates a tracking error signal for a tracking servo control in accordance with a DPD (Differential Phase Detection) scheme since a defocused state is detected at a high sensitivity and a quadrant detector is employed for light detection. The astigmatic method is also advantageous in that it is readily applied to a three-beam based optical pickup which uses three light spots since an optical pickup of smaller size can be employed.

An example of conventional optical pickup device using the astigmatic method is illustrated in FIG. 1. A light beam from a semiconductor laser 1 transmits a polarizing beam splitter 3, a collimator lens 4 and a quarter wavelength plate 6, and is focused by an objective lens 7 on an optical disc 5 positioned near the focus of the optical lens 7. The light beam is thus transformed into a light spot SP on a sequence of pits (track) on an information recording surface of the optical disc 5.

Light reflected back from the optical disc 5 is converged by the objective lens 7, transmits the quarter wavelength plate 6 and the collimator lens 4, is redirected by a polarizing beam splitter 3, and passes through a cylindrical lens 8 which applies astigmatism to the light. The resulting light forms a light spot SP near the center of a quadrant photodetector 9 which has a light receiving surface divided into four by two line segments which intersect perpendicularly in a track extending direction and in a disc radial direction.

The cylindrical lens 8, as illustrated in FIG. 2, is positioned on an optical path of the return light such that its central axis extends at an angle of 45° with respect to a direction in which the track of the disc 5 extends, so that the return light forms a line image M, an image plane B (hereinafter called the "minimum scattered circular image plane) on which a light beam becomes circular (minimum scattered circle) in the optical system applied with astigmatism, and a line image S. Therefore, the cylindrical lens 8 irradiates the quadrant photodetector 9 with a circular light spot SP as illustrated in FIG. 3A on the minimum scattered circular image plane B when a light beam converged on the recording surface of the optical disc 5 is focused, and irradiates the quadrant photodetector 9 with an elliptic light spot SP extending in a diagonal direction of the four-divided light receiving surface as illustrated in FIG. 3B or 3C when the light beam is defocused (when the optical disc 5 is too far (b) or too near (c) from the optical disk 5 illustrated in FIG. 1).

The quadrant photodetector 9 opto-electrically transduces a portion of the light spot irradiated to each of the four light receiving surfaces into an electric signal in accordance with its light intensity, and supplies the electric signals to a focus error detector circuit 12. The focus error detector circuit 12 performs a predetermined operation based on the electric signals supplied from the quadrant photodetector 9 to generate a signal (hereinafter called the "focus error signal" or FES) which is supplied to an actuator driving circuit 13. The actuator driving circuit 13 supplies a focusing driving signal to an actuator 15. The actuator 15 moves the objective lens 7 in a focusing direction in response to the focusing driving signal. In this way, the focus error signal is fed back to control the position of the objective lens.

As illustrated in FIG. 4, the quadrant photodetector 9 is comprised of four light receiving sections DET1-DET4 in first through fourth quadrants which are divided by two orthogonal division lines L1, L2, positioned adjacent to one another, and independent of one another. The focus error detector circuit 12 is connected to the quadrant detector 9. The quadrant photodetector 9 is positioned such that one of the division lines L1 is in parallel with a map in a direction in which the recording track of the optical disc 5 extends, i.e., in a tangential direction, and the other division line L2 is in parallel with a map in the radial direction. Respective opto-electrically transduced outputs from the light receiving sections DET1, DET3 symmetric about the center of the light receiving surface of the quadrant photodetector 9 are added by an adder 22, while respective opto-electrically transduced outputs from the light receiving sections DET2, DET4 are added by an adder 21. Outputs of the respective adders 21, 22 are supplied to a differential amplifier 23. The amplifier 23 calculates the difference between the supplied signals, and outputs the difference signal as a focus error signal (FES).

In this way, in the conventional focus error detector circuit 12, the outputs of the quadrant photodetector 9 are added by the adders 21, 22, respectively, and the difference between the outputs of the adders 21, 22 is calculated by the differential amplifier 23 to generate a focus error component. Specifically, as the signs of the light receiving sections on the quadrant photodetector 9 are indicated as their outputs, the focus error signal FES is expressed by the following equation (1):

$$FES=(DET1+DET3)-(DET2+DET4) \quad (1)$$

A so-called sigmoid characteristic of the focus error signal (FES) is shown in FIG. 5. When focused, a light spot intensity distribution is symmetric about the center O of the light receiving surface on the quadrant photodetector 9, i.e., symmetric in the tangential direction and in the radial direction, so that a light spot in the shape of true circle, as illustrated in FIG. 3A, is formed on the quadrant photodetector 9. Therefore, the values derived by adding the opto-electrically transduced outputs from the light receiving sections positioned on the diagonals are equal to each other, resulting in the focus error component equal to "0." On the other hand, when defocused, an elliptic light spot extending in a diagonal direction of the light receiving sections is formed on the quadrant photodetector 9 as illustrated in FIG. 3B or 3C, so that the values derived by adding the opto-electrically transduced outputs from the light receiving sections positioned on the diagonals differ in polarity from each other. Therefore, the focus error component output from the differential amplifier 23 presents a value in accordance with a focus error.

However, the astigmatic method is disadvantageously affected by noise introduced into the focus error signal (hereinafter called the "track traverse noise") when a light beam spot traverses a track on an optical disc if an optical pickup has aberration such as astigmatism. In other words, even when focused as shown in FIG. 3A, FES=0 may not be resulted.

Unwanted astigmatism in an optical pickup device may occur when an alignment accuracy is low, for example, when light beam transmitting planes of optics such as a diffraction grating and a half mirror are tilted to and therefore are not perpendicular to the optical axis of an emitted light beam, or when the light beam emitted from a semiconductor laser itself has astigmatism. In addition, astigmatism occurs as well due to birefringence of a disc substrate which relates to irradiation and reflection of the light beam.

While such unwanted astigmatism can be eliminated by slightly canceling it using optics such as a shaping prism, a so-called oblique astigmatism component, which extends, for example, at an angle of 45° with respect to a direction corresponding to a tangential (track) direction or a radial direction to the astigmatism direction, remains in the entire optical system. For example, when a converged light beam is irradiated to a disc substrate made of polycarbonate (PC), astigmatism appears at 45° to the tangential (track) direction or the diagonal direction.

In the irradiation optical system and light detection optical system in the optical pickup device in accordance with the astigmatic method, optical elements (including a semiconductor laser as a light source, LED and so on) are designed to avoid introducing unwanted astigmatism. However, it is difficult to completely remove unwanted astigmatism in practice. With the existence of unwanted astigmatism not used for the focus servo, the track traverse noise is introduced in an attempt of generating a focus error signal from an optical disc having lands and grooves on an information recording surface thereof. This is because the light intensity distribution is uneven in the circular light beam spot on the quadrant photodetector 9.

In conventional optical pickups for CD, since an objective lens has a small numerical aperture NA and the focus depth is large, the noise does not cause problems even if it introduces more or less into the focus error signal. However, when information is read from an optical disc, such as DVD-RAM, which has lands and grooves, the FES noise included in a focus error signal will influence more gravely the focus servo of the objective lens because of a larger numerical aperture of the objective lens and a smaller focus depth. The influence becomes more grave if the depth of the grooves is set such that a push-pull error appears.

Further, as shown in FIG. 5, in the conventional astigmatic method, a sudden response characteristic is provided within a range in which an astigmatism difference occurs between the line image M including the minimum scattered circular image plane B and the line image S, i.e., in an effective range (capture range) of the focus error signal. It is desirable that an essentially ineffective focus error signal out of the capture range suddenly becomes zero. However, in the conventional focus error detection, the elliptic spot gradually becomes large due to defocusing, and extends off the detector, at which time the quadrant light receiving sections start outputting the opto-electrically transduced signals, and moreover, outputs from diagonal components leak in, a sudden characteristic is not achieved. As the objective lens has an increasingly larger numerical aperture corresponding to higher density optical discs in recent years, further limitations are imposed on the range of an operation distance of the objective lens. Therefore, there is a need for correct detection of the capture range in the conventional astigmatic method.

An attempt to correctly detect a capture range of focus servo is disclosed, for example, in Laid-open Japanese Patent Application No. 8-185635 entitled "Astigmatic method." The disclosed method detects the capture range when a multi-layer disc is reproduced based on outputs of auxiliary detectors disposed outside of a quadrant photodetector. However, in this astigmatic method, an elliptic spot continuously becomes larger due to defocusing, and extends off the quadrant detector, at which time the quadrant detector starts outputting signals, thereby resulting in the inability to achieve a sudden capture range detecting signal characteristic. In addition, this astigmatic method is vulnerable to a shifted optical axis of a light beam spot to the quadrant photodetector. In the conventional focus error detection, the defocused light beam, spreading about the optical axis, will not largely extend off the photodetector. For this reason, for reproducing a multi-layer disc which has a narrow interlayer spacing such as DVD having a plurality of information recording surfaces stacked in the film thickness direction, the influence of interlayer crosstalk cannot be suppressed unless the area of the photodetector is set extremely small. A smaller area of a light receiving element will result in a smaller capture range, causing a deteriorated preability of a system.

OBJECT AND SUMMARY OF THE INVENTION

The present invention has been made to solve the above problems, and it is an object of the present invention to provide an optical pickup device and a focus error detecting method which are less susceptible to track traverse noise, optical disc thickness error, shifted optical axis of light beam, and so on, and are capable of employing a combination of a three-beam method and a DPD method.

The present invention provides an optical pickup device for detecting a focus error of the light beam, having an irradiation optical system for focusing a light beam to form a spot on a track on an information recording surface of an optical recording medium, and a light detection optical system for leading return light reflected back from the spot to a photodetector. The optical pickup apparatus comprises:

a focus error detecting optical element having an area quadrisected into first through fourth quadrants from the center of an optical path of the return light along two division lines extending corresponding to a direction in which the track extends and a direction perpendicular to the extending direction on a plane substantially perpendicular to the optical path of the return light, for applying the return light passing through adjacent ones of the areas on the same side of the division line with astigmatism in directions rotated by 90° from each other about the optical path, and for separating the return light into at least four corresponding to the areas; and a photodetector having a plurality of spaced light receiving elements for receiving the separated return light, each of the light receiving elements having contour lines corresponding to the division lines on an image plane on which a light beam is shaped into a circular beam in the optical system in which the astigmatism is applied, and comprised of two light receiving areas divided by a bisect line extending substantially in parallel with one of the contour lines.

In one aspect of the optical pickup device according to the invention, said bisect line of said light receiving element extends corresponding to a direction perpendicular to the direction in which the track extends.

In another aspect of the optical pickup device according to the invention, said bisect line of said light receiving element extends to a position at which signals output from two light receiving areas of said light receiving element, generated by spots of the return light received on said light receiving element on the image plane on which the light beam is shaped into a circular beam in the optical system in which the astigmatism is applied, is substantially equal.

In a further aspect of the invention, the optical pickup device further comprises a calculating circuit connected to said light receiving elements for generating a focus error signal from the sum of differences of signals output from two light receiving areas of said light receiving elements.

In a still further aspect of the invention, the optical pickup device further comprises auxiliary light receiving elements for receiving the return light out of two line image ranges caused by the astigmatism, said auxiliary light receiving elements positioned along the contour line corresponding to the bisect line of said light receiving element.

In another aspect of the invention, the optical pickup device further comprises a calculating circuit connected to said auxiliary light receiving elements for calculating the sum of signals output from said auxiliary light receiving elements generated by the return light from two sets of areas existing at diagonal positions in said first through fourth quadrants.

In a further aspect of the invention, the optical pickup device further comprises a capture range calculating circuit connected to said light receiving element and said auxiliary light receiving elements for adding the sum of signals output from said auxiliary light receiving elements generated by the return light from two sets of areas existing at diagonal positions in said first through fourth quadrants to the sum of differences of outputs from two light receiving areas of said light receiving elements.

In a still further aspect of the optical pickup device according to the invention, said auxiliary light receiving elements are integrated into said light receiving areas on the opposite side of said contour line corresponding to said division line of said light receiving elements.

In another aspect of the optical pickup device according to the invention, said focus error detecting optical element includes:

cylindrical lenses placed at one set of respective diagonal positions in said first through fourth quadrants, and having central axes extending in a direction in which said division line extends; and cylindrical lenses placed at the other set of respective diagonal positions in said first through fourth quadrants, and having central axes extending in a direction at 90° to the direction in which said division line extends, wherein said cylindrical lenses placed in diagonal positions have the central axes offset from said division line in parallel therewith.

In a further aspect of the optical pickup device according to the invention, said cylindrical lenses placed in the area at said at least one set of diagonal positions have the central axes offset from said division line and on opposite sides to each other.

In a still further aspect of the optical pickup device according to the invention, said offset cylindrical lenses are placed only in the areas at said one set of diagonal positions, further comprising deflecting prism surfaces positioned in the areas of said cylindrical lenses at the remaining set of diagonal positions, and tilted at different angles to planes vertical to optical paths of the return light in said areas.

In another aspect of the optical pickup device according to the invention, said focus error detecting optical element includes:

cylindrical lenses placed at one set of respective diagonal positions in said first through fourth quadrants, and having central axes extending in a direction in which said division line extends; and cylindrical lenses placed at the other set of respective diagonal positions in said first through fourth quadrants, and having central axes extending in a direction at 90° to the direction in which said division line extends, and said optical pickup device further comprising deflecting prism surfaces placed in diagonal positions, and tilted with respect to planes perpendicular to the optical paths of the return light in said areas.

In a further aspect of the optical pickup device according to the invention, said deflecting prism surfaces placed in diagonal positions are tilted at different angles to the places perpendicular to the plane vertical to the optical paths of the return light in said areas.

In a still further aspect of the optical pickup device according to the invention, said deflecting prism surfaces are placed only in diagonal positions, said cylindrical lenses placed in the areas at the remaining set of diagonal positions have their central axes offset from said division line in parallel therewith and on opposite side to each other.

In another aspect of the optical pickup device according to the invention, said light receiving elements are arranged in parallel with one of said division lines of said focus error detecting optical element.

In a further aspect of the invention, the optical pickup device further comprises:

a diffraction grating disposed in said irradiation optical system; and a pair of sub-photodetector disposed on one side of a column of said parallelly arranged light receiving elements for receiving a + primary diffraction sub-beam and a − primary diffraction sub-beam, respectively, wherein said optical pickup device conducts a tracking control based on a three-beam method.

In a still further aspect of the invention, the optical pickup device further comprises:

a comparator/detector for detecting a difference in phase of respective sum signals output from two sets of said light receiving elements existing at diagonal positions for independently receiving the return light passing through said first through fourth areas of said focus error detecting optical element, wherein said optical pickup device conducts a tracking control based on a phase difference method.

In another aspect of the invention, the optical pickup device further comprises auxiliary light receiving elements each disposed adjacent to each of said light receiving areas along said contour line corresponding to said division lines of said light receiving elements.

In a further aspect of the invention, the optical pickup device further comprises a focus error signal correction calculating circuit connected to said light receiving elements and said auxiliary light receiving elements for adding the sum of differences of signals output from said auxiliary light receiving elements to the sum of differences of signals output from two light receiving areas of said light receiving elements to generate a focus error signal.

The present invention also provides a focus error detecting method for detecting a focus error in a light beam in an optical pickup device having an irradiation optical system for focusing the light beam to form a spot on a track on an information recording surface of an optical recording medium, and a light detection optical system for leading return light reflected back from the spot to a photodetector. The method comprises the steps of:

using a focus error detecting optical element having an area quadrisected into first through fourth quadrants from the center of an optical path of the return light along two division lines extending corresponding to a direction in which the track extends and a direction perpendicular to the extending direction on a plane substantially perpendicular to the optical path of the return light, to apply the return light passing through adjacent ones of the areas on the same side of the division line with astigmatism in directions rotated by 90° from each other about the optical path, and to separate the return into at least four corresponding to the areas; and using a plurality of spaced light receiving elements for receiving the separated return light, each of the light receiving elements having contour lines corresponding to the division lines on an image plane on which a light beam is shaped into a circular beam in the optical system in which the astigmatism is applied, and comprised of two light receiving areas divided by a bisect line extending substantially in parallel with one of the contour lines, to generate a focus error signal from the sum of differences of signals output from two light receiving areas of the light receiving elements.

BRIEF DESCRIPTION OF THE DRAWINGS

FIGS. 22A through 22E are top plan views for explaining the action of the photodetector when the focus position is changed in the optical pickup illustrated in FIG. 21;

FIGS. 23, 24A through 24E, 28 and 29, and 30A through 30D are top plan views for explaining the action of the photodetector in the optical pickup of the present invention;

DETAILED DESCRIPTION OF THE PREFERRED EMBODIMENTS

In the following, embodiments according to the present invention will be described with reference to the accompanying drawings.

(Optical Pickup Device and Optical Path)

Figure 1:
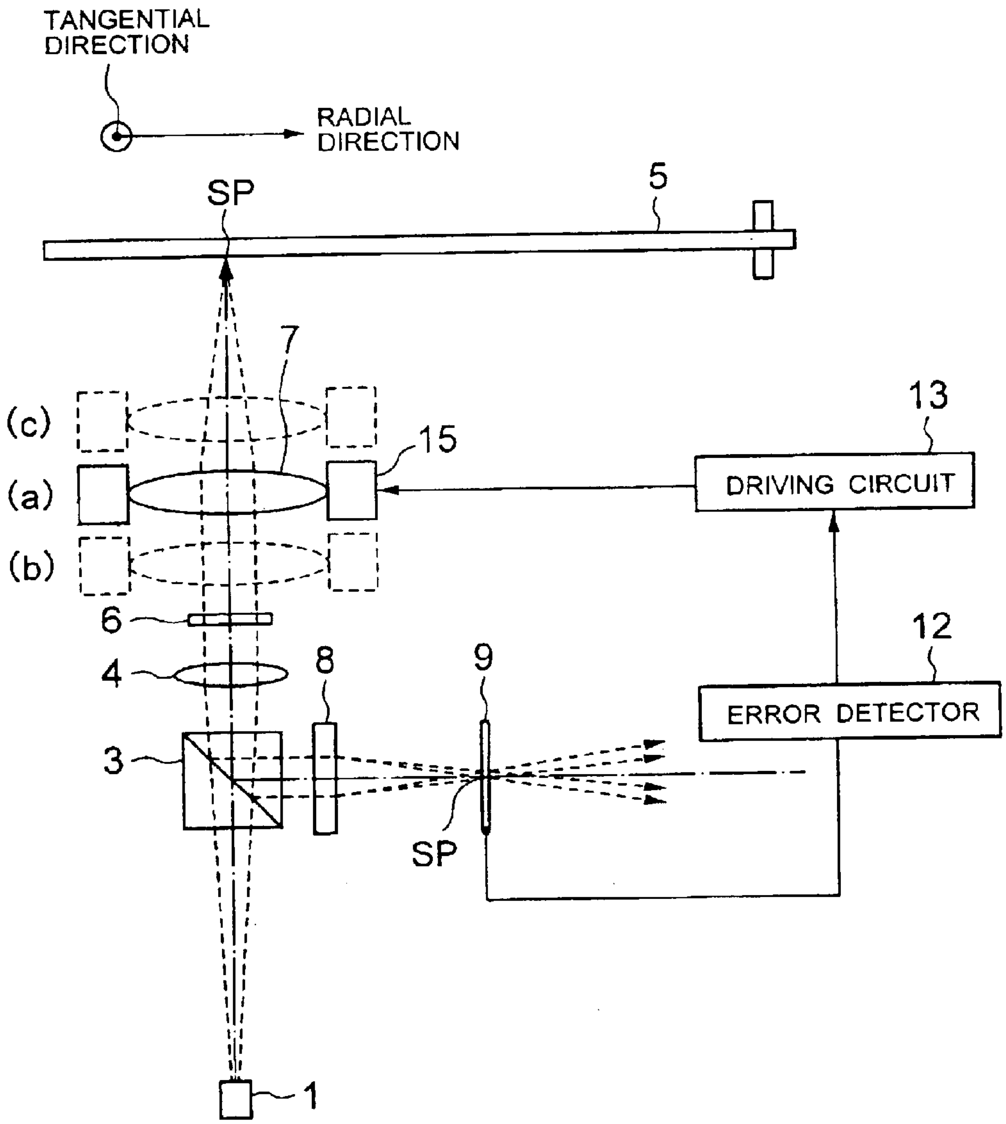
FIG. 1 is a diagram illustrating the configuration of an optical pickup device.
Figure 2:
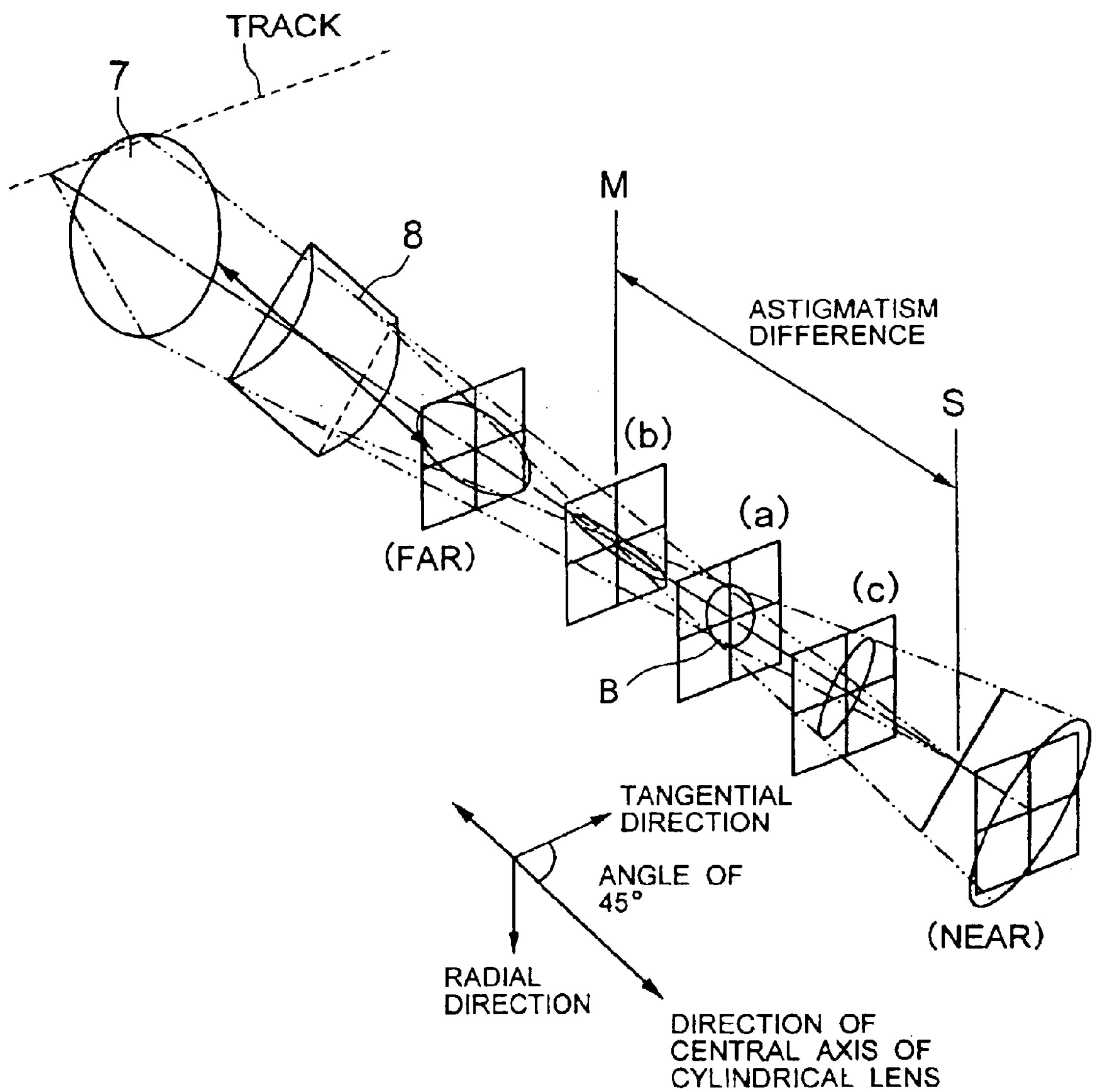
FIG. 2 is a perspective view for explaining the action of a cylindrical lens in an astigmatic method in the optical pickup device.
Figure 3:
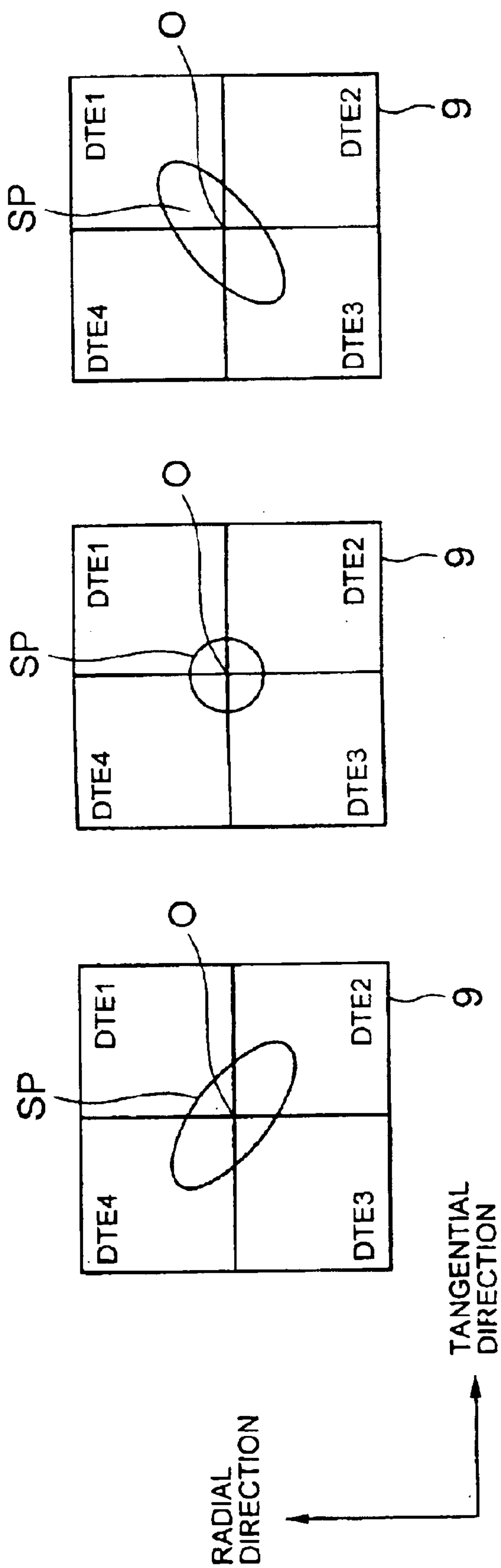
FIGS. 3A through 3C are top plan views for explaining the action of a quadrant detector when a focus position is changed in the optical pickup illustrated in FIG. 2.
Figure 4:
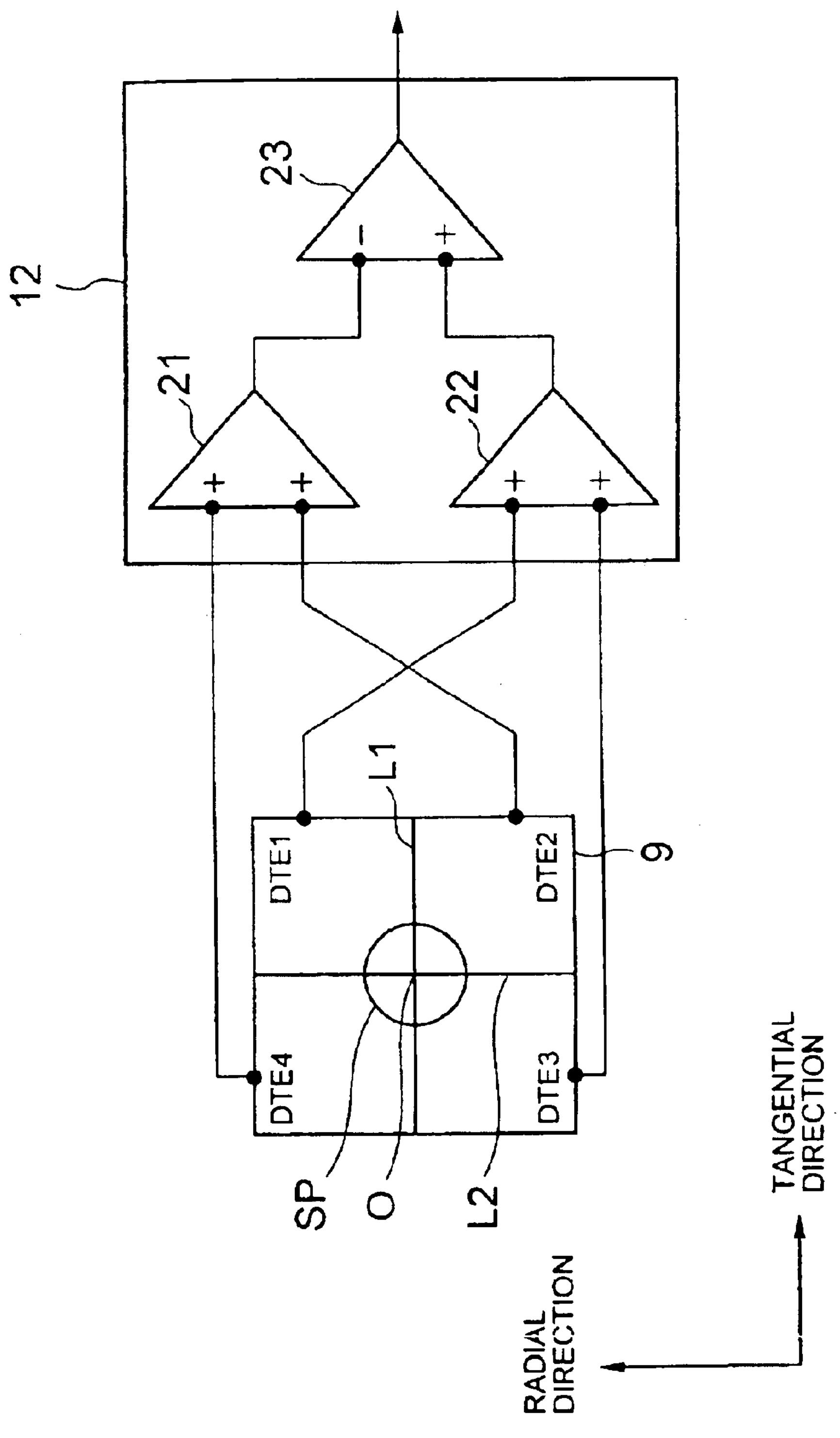
FIG. 4 is a diagram illustrating the configuration of a focus error detector circuit in the optical pickup illustrated in FIG. 2.
Figure 5:
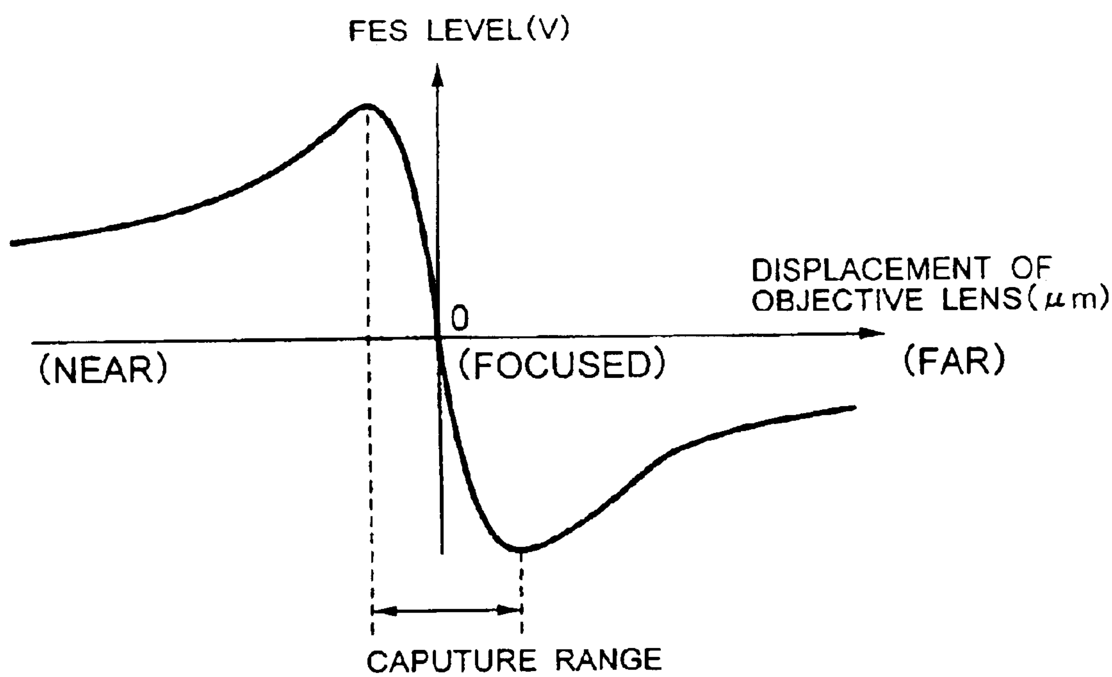
FIG. 5 is a graph showing the focus error signal characteristic provided by the optical pickup illustrated in FIG. 2.
Figure 6:
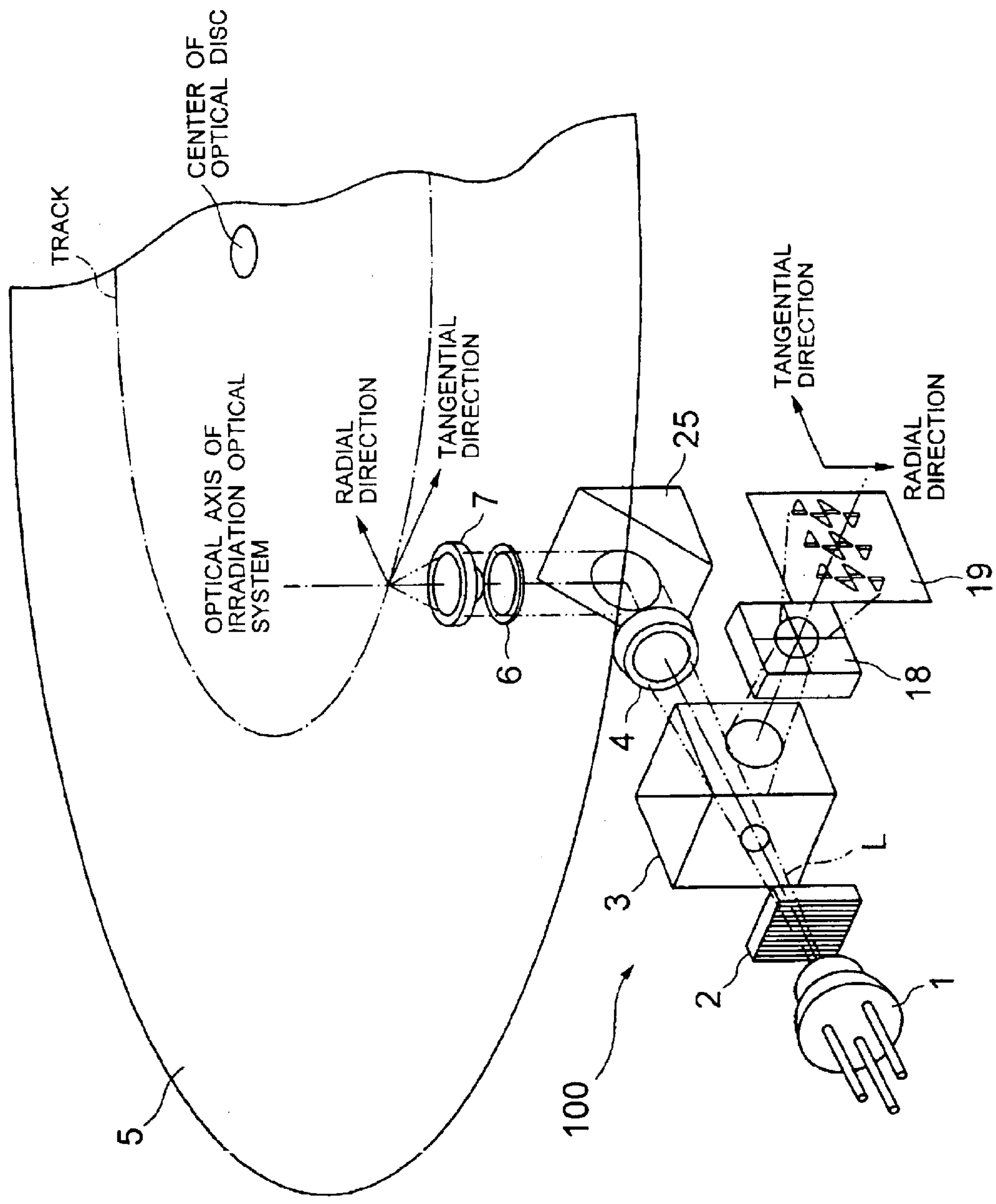
FIG. 6 is a perspective view illustrating the configuration of an optical pickup according to an embodiment of the present invention.
Figure 7:
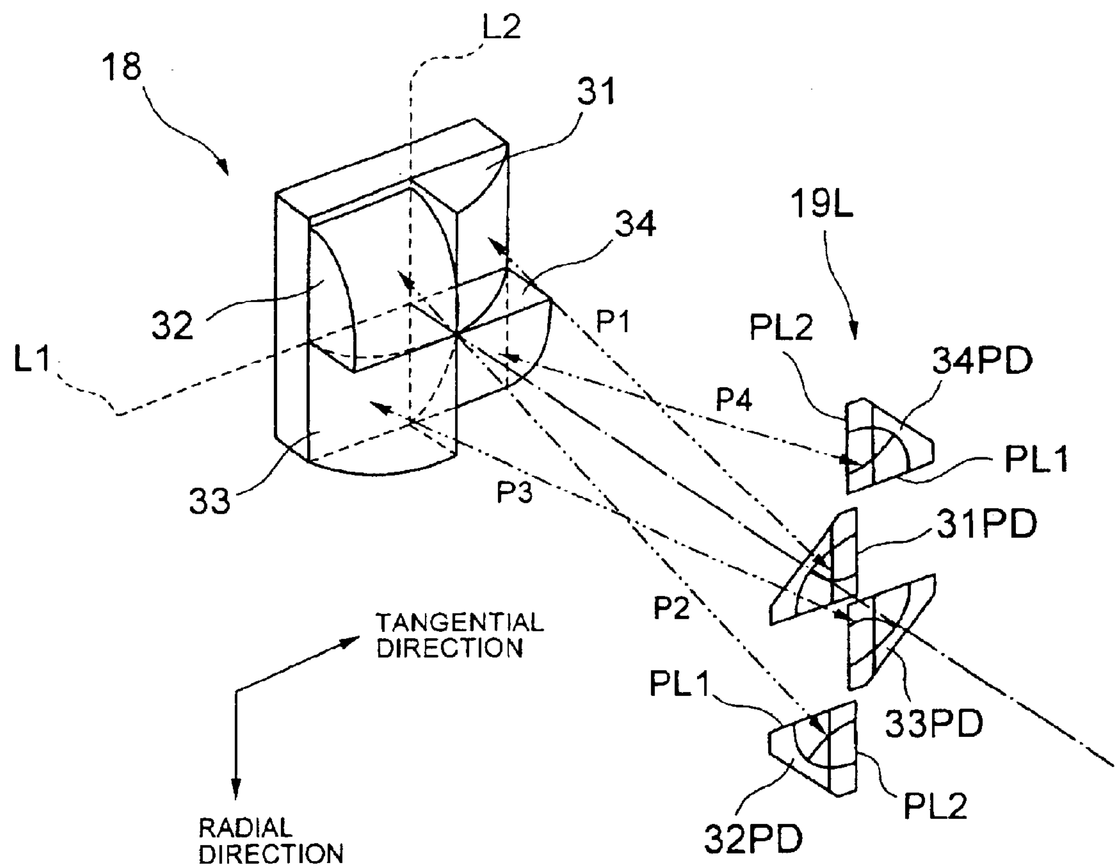
FIG. 7 is a perspective view for explaining a focus error detecting optical element and a photodetector in the optical pickup of the present invention.

FIG. 6 is a diagram illustrating the configuration of an optical pickup according to one embodiment of the present invention. As illustrated in FIG. 6, this optical pickup 100 comprises a semiconductor laser 1 functioning as a light source; a grating 2; a polarizing beam splitter 3; a collimator lens 4; a mirror 25; a quarter wavelength plate 6; an objective lens 7; a focus error detecting optical element 18 made of an optically transparent material; and a photodetector 19. Above the objective lens 7, an optical disc 5 is loaded spaced apart therefrom. Also, as illustrated in FIG. 7, the focus error detecting optical element 18 comprises a first lens section 31, a second lens section 32, a third lens section 33 and a fourth lens section 34, each formed of a cylindrical lens, and the photodetector 19 comprises a first light receiving element 31PD, a second light receiving element 32PD, a third light receiving element 33PD and a fourth light receiving element 34PD, corresponding to these lens sections, which are arranged along one of division lines as a column 19L. These components will be described later in greater detail. The objective lens 7 is provided with an objective lens driving mechanism (not shown) similar to the prior art, which can move the objective lens 7 in the forward and backward directions of the optical axis.

A light beam emitted from the semiconductor laser 1 is incident on the polarizing beam splitter 3 through the grating 2. The polarizing beam splitter 3 has a polarizing mirror. The incident light beam passes through the polarizing beam splitter 3, and is redirected by the mirror 25 through the collimator lens 4 so that its optical path is bent at a right angle. Then, the light beam passes through the quarter wavelength plate 6, and is irradiated onto an information recording surface of the optical disc 5 from the objective lens 7. The objective lens 7 focuses the light beam onto a sequence of pits or a track formed spirally or concentrically on the optical disc 5 to form a spot thereon. With this irradiated light beam spot, recording information can be written into or read from the information recording surface of the optical disk 5.

Return light of the light beam spot reflected from the information recording surface of the optical disc returns back along the same optical path, and is incident again on the polarizing beam splitter 3 through the objective lens 7, quarter wavelength plate 6, mirror 25 and collimator lens 4. In this event, the return light is changed its optical path by the polarizing beam splitter 3 in a direction different from the direction toward the semiconductor laser 1, and is led to the focus error detecting optical element 18. The return light passing through the focus error detecting optical element 18 is applied with astigmatism, and divided into four, a first optical path P1, a second optical path P2, a third optical path P3 and a fourth optical path P4, respectively, by a first lens section 31, a second lens section 32, a third lens section 33 and a fourth lens section 34 from the center of the optical path, as illustrated in FIG. 7, and incident on four spaced apart light receiving elements of the photodetector 19, a first light receiving element 31PD, a second light receiving element 32PD, a third light receiving element 33PD and a fourth light receiving element 34PD, respectively. Each of the light receiving elements of the photodetector 19 opto-electrically transduces the received light, and performs a predetermined operation on a light detection optical signal output through the opto-electric transduction to generate a focus error signal.

(Focus Error Detecting Optical Element)

As illustrated in FIG. 7, the focus error detecting optical element 18 is formed, for example, of glass, and has a first through fourth quadrants, divided into four from the center of the optical path by two division lines L1, L2 which extend corresponding to a direction in which a track on the optical disc 5 extends (tangential direction) and a direction perpendicular to the extending direction (radial direction) on a plane perpendicular to the optical path of the return light. On the respective quadrants, the first lens section 31, second lens section 32, third lens section 33 and fourth lens section 34 of the cylindrical lens are placed to form the focus error detecting optical element 18.

Figure 8:
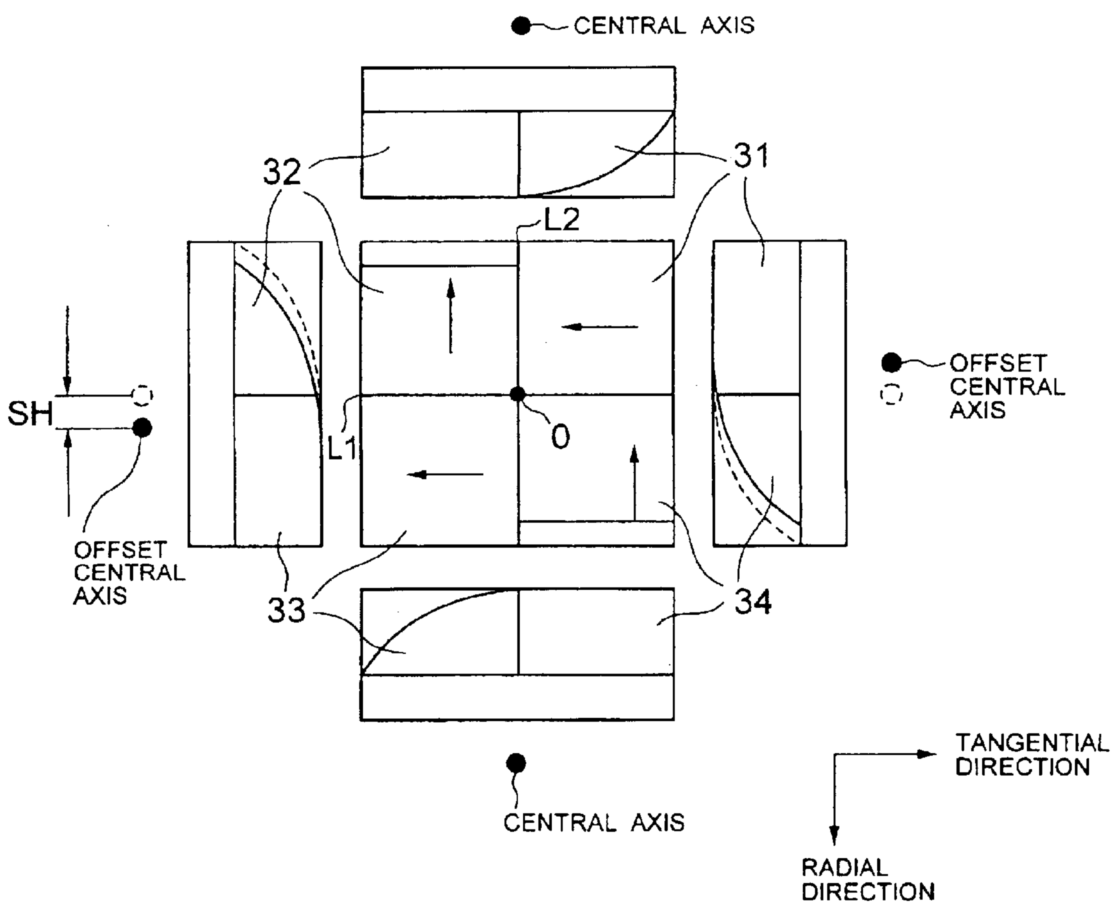
FIG. 8 is a diagram for explaining the focus error detecting optical element in the optical pickup of the present invention.

FIG. 8 illustrates a front view, a left and a right side view, and a top and a bottom view of the focus error detecting optical element 18. FIG. 8 shows views seen from the photodetector 19 on the optical axis. As illustrated, the first through fourth lens sections 31–34 apply return light passing through quadrant areas adjoining on the same side of the division line L1 or L2 with astigmatism (arrows) in directions rotated by 90° from each other, and separate the return light into four by the respective quadrants. For example, the first and third lens sections 31, 33 placed on quadrants at diagonal positions are comprised of lens surfaces of cylindrical lenses which have the central axes extending in a direction in which the division line L2 extends (radial direction). Here, the central axis refers to a straight line on which central curvature radial centers of the cylindrical lenses concentrate. The second and fourth lens sections 32, 34 at the other diagonal positions are comprised of lens surfaces of cylindrical lenses which have the central axes extending in a direction in which the division line L1 extends (tangential direction). The central axis of a lens section at one diagonal position is rotated by 90° about the optical axis with respect to that at the other diagonal position. With this structure, return light portions passing through the quadrants at the diagonal positions are applied with astigmatism in the directions rotated by 90° with respect to each other.

Further, as illustrated in FIG. 8, the central axes of the first and third lenses 31, 33 extend in parallel with the division line L2 on a plane which includes the optical axis of the return light and the division line L2. On the other hand, the central axes of the second and fourth lens sections 32, 34 extend in parallel with the division line L1 symmetrically from a plane including the optical axis of the return light and the division line L1, i.e., on a plane displaced by a distance SH from that surface in the opposite directions from each other. By thus offsetting the central axes of the second and fourth lens sections 32, 34 from the division line in parallel, the return line applied with the astigmatism rotated by 90° by the second and fourth lens sections 32, 34 can be spatially separated from the return light applied with the astigmatism by the first and third lens sections 31, 33. The distance SH between the central axes of the second and fourth lenses 32, 34 can set the spacing between the second light receiving element 32PD and the fourth light receiving element 34PD in the photodetector 19.

In the foregoing description, the first quadrant refers to an area in which an X-coordinate and a Y-coordinate both take positive values in an orthogonal XY coordinate system where a plane is divided into four areas by an X-axis in the horizontal direction and a Y-axis in the vertical direction. The second quadrant in turn refers to an area of the four divided areas which is adjacent to the first quadrant and in which an X-coordinate takes a negative value and a Y-coordinate takes a positive value. The third quadrant refers to an area of the four divided area which is adjacent to the second area and in which an X-coordinate and a Y-coordinate both take negative values. The fourth quadrant refers to an area of the four divided areas which is adjacent to the first and third quadrants and in which an X-coordinate takes a positive value and a Y-coordinate takes a negative value.

The division of the return light by the astigmatism applied by the lens sections placed on the quadrants at diagonal positions will be described in detail with reference to FIGS. 9 through 11.

Figure 9:
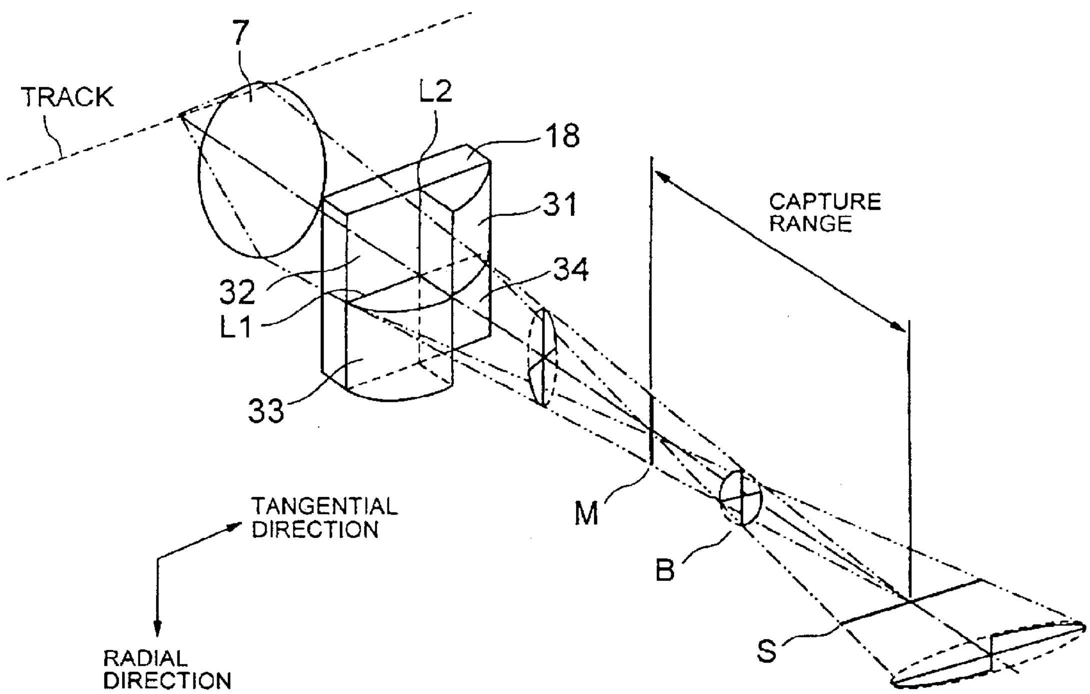
FIGS. 9 through 11 are perspective vies for explaining the action of the focus error detecting optical element in the optical pickup of the present invention.

FIG. 9 only illustrates the first and third lens sections 31, 33 of the focus error detecting optical element 18. A light component of return light from the objective lens in the first quadrant, which passes the first lens section 31, passes the first quadrant up to the line image M, transitions to the second quadrant as it passes the line image M, and transitions to the third quadrant as it passes the line image S. Therefore, in the capture range, the light component changes from a line image spot along the division line L2 in the second quadrant to a line image spot along the division line L1, tilted by 90°, through a fan-shaped spot. No spot is formed in the second quadrant out of the capture range.

On the other hand, a light component in the third quadrant, which passes the third lens section 33 at the diagonal position, passes the third quadrant up to the line image M, transitions to the fourth quadrant as it passes the line image M, and transitions to the first quadrant as it passes the line image S. Therefore, in the capture range, the light component changes from a line image spot along the division line eL2 in the fourth quadrant to a light image spot along the division line L1, tilted by 90°, through a fan-shaped spot. No spot is formed in the fourth quadrant out of the capture range.

Figure 10:
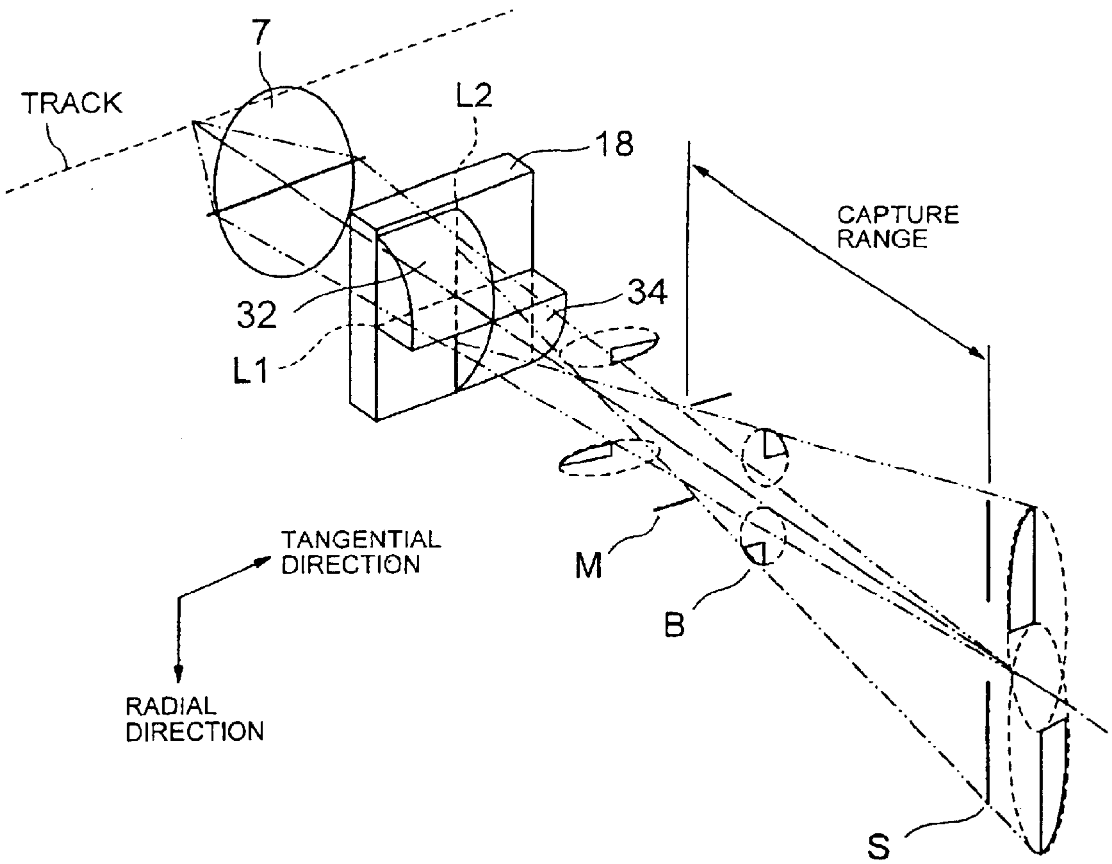

FIG. 10 only illustrates the second and fourth lens sections 32, 34 of the focus error detecting optical element 18. A light component of return light from the objective lens in the second quadrant, which passes the second lens section 32, passes the second quadrant up to the line image M, transitions to the third quadrant as it passes the line image M, and transitions to the fourth quadrant as it passes the line image S. Therefore, in the capture range, the light component changes from a line image spot along the division line L1 in the third quadrant, to a line image spot along the division line L2, tilted by 90°, through a fan-shaped spot. No spot is formed in the third quadrant out of the capture range.

On the other hand, a light component in the fourth quadrant, which passes the fourth lens section 34 at the diagonal position, passes the fourth quadrant up to the line image M, transitions to the first quadrant as it passes the line image M, and transitions to the second quadrant as it passes the line image S. Therefore, in the capture range, the light component changes from a line image spot along the division line L1 in the first quadrant to a line image spot along the division line L2, tilted by 90°, through a fan-shaped spot. No spot is formed in the first quadrant out of the capture range.

It should be noted in FIG. 10 that since the central axes of the second and fourth lenses 32, 34 offset in parallel from the division line L1, the spots of return light in the respective quadrants are displaced away from the division line L1 in the opposite direction, so that they are further separated spatially from each other.

Figure 11:
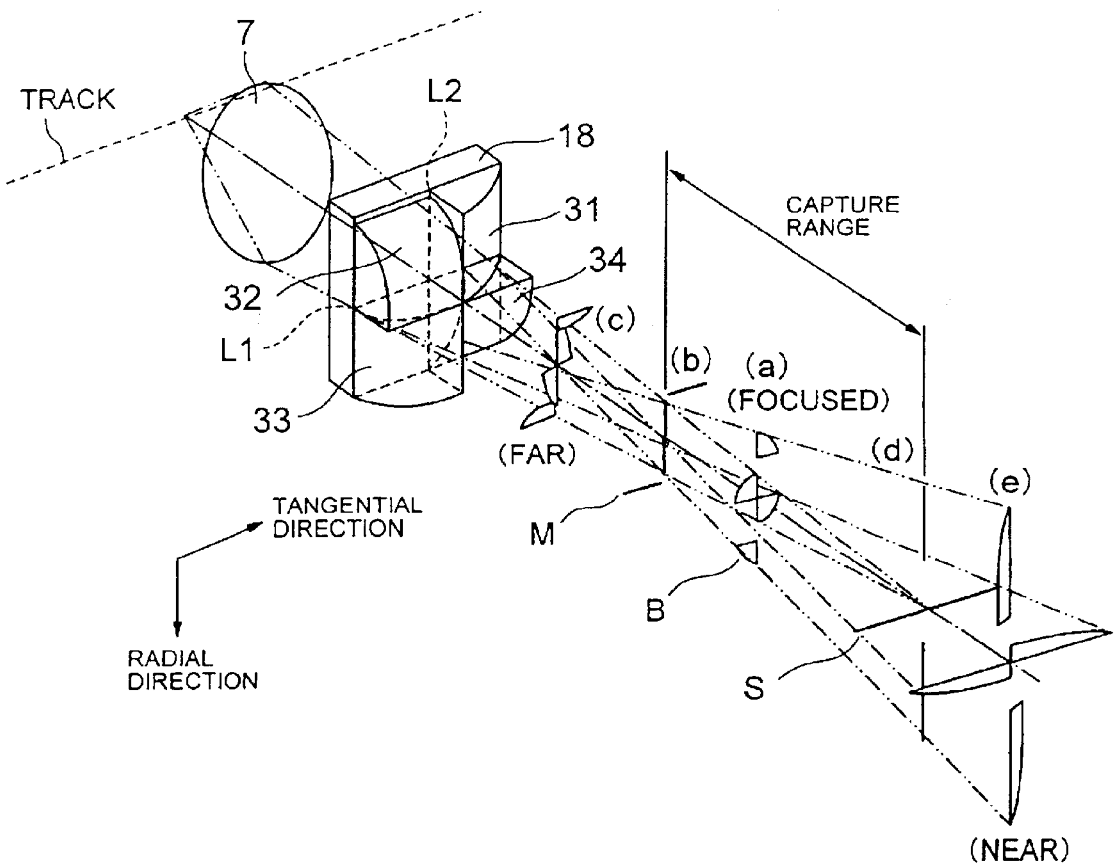

FIG. 11 is a combination of FIGS. 9 and 10. As illustrated, return light components passing through the first through fourth lens sections 31–34 are spatially divided by the astigmatism applied thereby.

(Photodetector)

As illustrated in FIG. 7, the photodetector 19 has the first light receiving element 31PD, second light receiving element 32PD, third light receiving element 33PD and fourth light receiving element 34PD placed on the minimum scattered circular image plane B by the astigmatism applied by the first through fourth lens sections 31–34, spaced apart from one another, such that they receive the return light components separated by the first through fourth lens sections 31–34, respectively. Each of the light receiving elements opto-electrically transduce the light component into an electric signal in accordance with a light intensity received by its light receiving area, and output the electric signal. Also, the first through fourth light receiving elements 31PD–34PD are arranged along the division line L2 as a column 19L.

As illustrated in FIG. 7, each of the first through fourth light receiving elements 31PD–34PD of the focus error detecting optical element 18 has contour lines PL1, PL2 corresponding to the division lines L1, L2.

Figure 12:
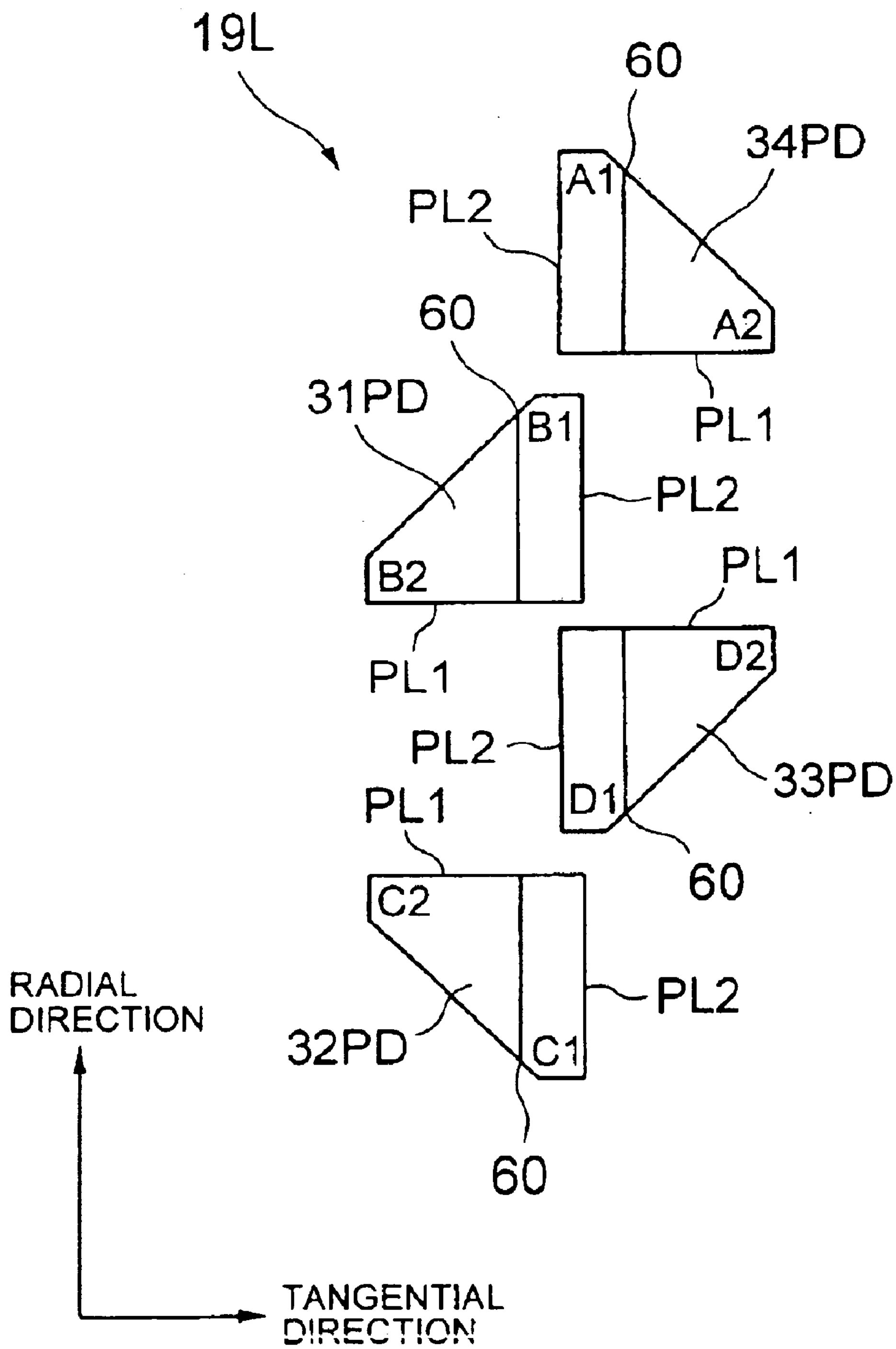
FIGS. 12 through 14 and 16A through 16D are top plan views for explaining the action of the photodetector in the optical pickup of the present invention.

As illustrated in FIG. 12, the first light receiving element 31PD is comprised of two light receiving areas B1, B2 divided by a bisect line 60 which extends substantially in parallel with one of the contour lines PL2. The second light receiving element 32 is comprised of two light receiving areas C1, C2 divided by the bisect line 60. The third light receiving element 33 is comprised of two light receiving areas D1, D2 divided by the bisect line 60. The third light receiving element 33PD and the fourth light receiving element 34PD are comprised of two light receiving areas A1, A2 divided by the bisect line 60. In other words, the bisect line 60 extends to a position so as to make equal those signals output from a pair of light receiving areas, which are generated by the spots of the return light components received by the respective light receiving elements on the minimum scattered circular image plane by the astigmatism. FIG. 12 is a diagram illustrating the first through fourth light receiving elements 31PD–34PD viewed through from the focus error detecting optical element 18 on the optical axis of the return light.

The optical pickup 100 comprises a calculating circuit (not shown) connected to the light receiving areas of the light receiving elements of the photodetector 19 to output a focus error signal and so on. The focus error signal is supplied to an objective lens driving mechanism.

The calculating circuit executes a calculation expressed by the following equation (2) to generate the focus error signal FES, indicating the signs of the light receiving areas (B1, B2), (C1, C2), (D1, D2), (A1, A2) of the first through fourth light receiving elements 31PD–34PD as their outputs:

$$FES=(A1+B2+C1+D2)-(A2+B1+C2+D1) \qquad (2)$$

Next, the action of the photodetector 19 will be described when the focus position of the objective lens has been changed in the optical pickup 100 with reference to FIG. 13. FIGS. 13A–13E correspond to spots (a)–(e), respectively.

FIG. 13A shows a state of return light spots on the first through fourth light receiving elements 31PD–34PD when the light beam from the optical pickup 100 is focused on the information recording surface of the optical disc. When the light beam is focused, light applied with the astigmatism and divided by the respective quadrants of the focus error detecting optical element 18 is incident on the corresponding light receiving elements 31PD–34PD on both sides of the division line 60 as quarter circles, i.e. fan-shaped light spots having the same shape and size (area). Therefore, when the light beam is focused, light detection electric signals output from the light receiving areas (B1, B2), (C1, C2), (D1, D2), (A1, A2) are equal to one another, so that FES is zero as calculated from the equation (2).

Figures 13B, 13D:
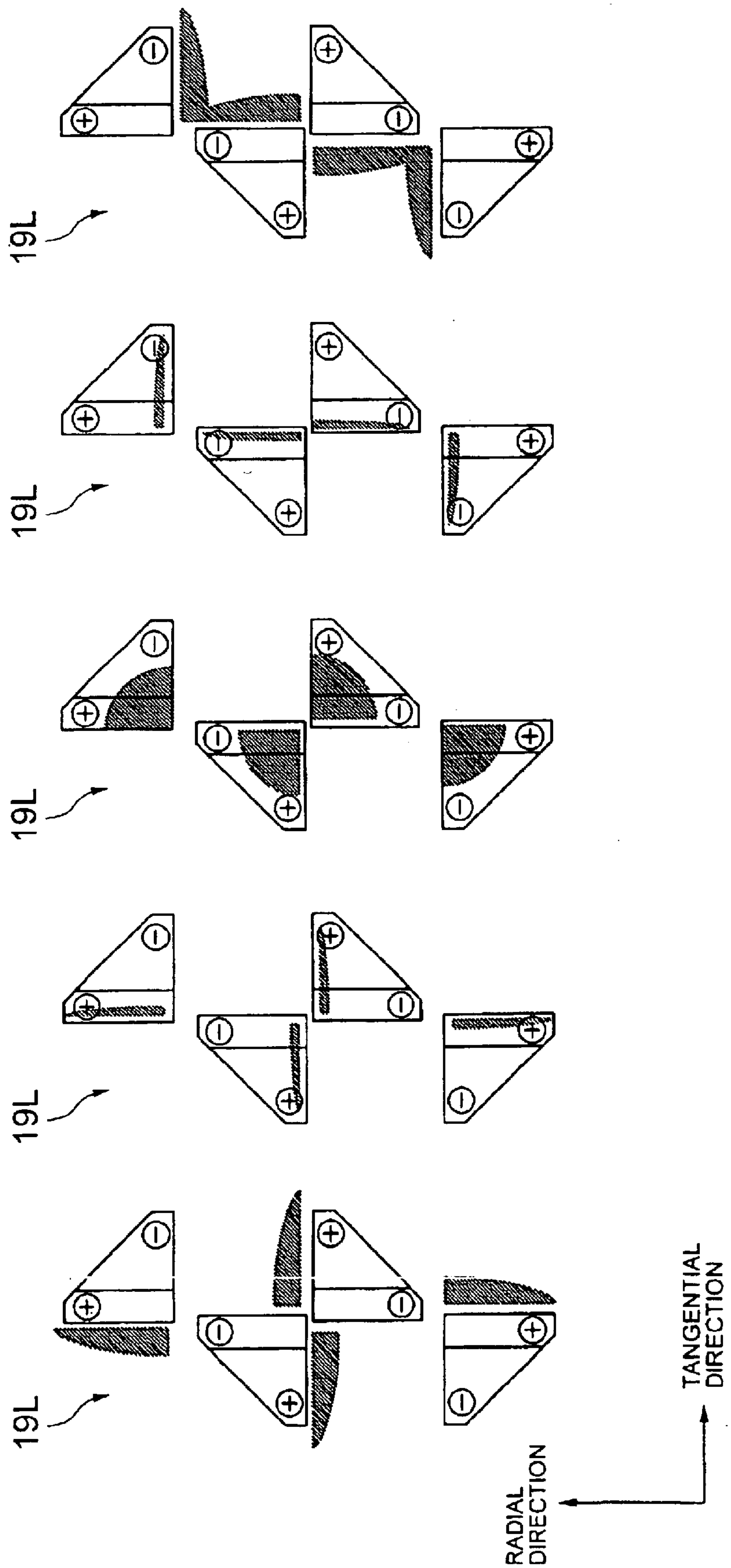

FIG. 13B shows a state of return light spots on the first through fourth light receiving elements 31PD–34PD when the light beam from the optical pickup 100 is not focused on the information recording surface of the optical disc, with the objective lens positioned further away from the optical disc than when the light beam is focused. When the optical disc is far away from the focus position, light applied with the astigmatism by the first and third lens sections 31, 33 of the first and third quadrants of the focus error detecting optical element 18 is incident on the light receiving areas B1, D1, extending in an L2 direction, as linear light spots extending in the L2 direction. Light applied with the astigmatism by the second and fourth lens sections 32, 34 of the second and fourth quadrants of the focus error detecting optical element 18 is shaped into linear light spots extending in an L1 direction on the light receiving areas (A1, A2), (C1, C2), which are incident across the light receiving areas. Therefore, when the objective lens is positioned further away from the optical disc than when the light beam is focused, these linear light spots have the same shape and size (area) so that FES is a negative value of the sum of the outputs from the light receiving areas B1, D1, as calculated from the equation (2).

FIG. 13C shows a state of return light spots near the first through fourth light receiving elements 31PD–34PD when the light beam is not focused, and the objective lens is positioned yet further away from the optical disc than when the light beam is focused. When the optical disc is positioned yet further away exceeding the capture range, light components applied with the astigmatism by the first through fourth lens sections 31–34 of the focus error detecting optical element 18 are shaped into light spots which spread from linear light spots and extend off the quadrants on the opposite sides of the diagonals beyond the division lines, respectively, and are incident on the light receiving elements. Therefore, when the optical disc is yet further away from the optical disc than when the light beam is focused, none of these light spots reaches any light receiving element, since the first through fourth light receiving elements 31PD–34PD are limited their areas by the contours L1, L2 corresponding to the corresponding division lines L1, L2. Therefore, FES is zero, as calculated from the equation (2).

FIG. 13D shows a state of return light spots on the first through fourth light receiving elements 31PD–34PD when the light beam from the optical pickup 100 is not focused on the information recording surface of the optical disc, and the objective lens is positioned nearer to the optical disc than when the light beam is focused. When the optical disc is nearer, light applied with the astigmatism by the first and third lens sections 31, 33 of the first and third quadrants of the focus error detecting optical element 18 is shaped into linear light spots extending in the L1 direction on the light receiving areas (B1, B2), (D1, D2), which are incident across the light receiving areas. On the other hand, light applied with the astigmatism by the second and fourth lens sections 32, 34 of the second and fourth quadrants of the focus error detecting optical element 18 are shaped into linear light spots extending in the L2 direction on the light receiving areas A1, C1, extending in the L2 direction, which are incident on the light receiving areas, respectively. Therefore, when the optical disc is nearer to the optical disc than when the light beam is focused, these linear light spots have the same shape and size (area), so that FES is a positive value of the sum of the outputs from the light receiving areas A1, C1, as calculated from the equation (2).

FIG. 13E shows a state of return light spots near the first through fourth light receiving elements 31PD–34PD when the light beam is not focused, and the objective lens is further nearer to the optical disc than when the light beam is focused. When the optical disc is positioned nearer beyond the capture range, light components applied with the astigmatism by the first through fourth lens sections 31–34 of the focus error detecting optical element 18 are shaped into light spots which spread from linear light spots and extend off the quadrants on the opposite sides of the diagonals beyond the division lines, respectively, and are incident on the light receiving elements. Therefore, when the optical disc is further nearer to the optical disc than when the light beam is focused, none of these light spots reaches any light receiving element, since the first through fourth light receiving elements 31PD–34PD are limited their areas by the contours L1, L2 corresponding to the corresponding division lines L1, L2. Therefore, FES is zero, as calculated from the equation (2).

Thus, when FES expressed by the equation (2) is used as a focus error signal, it can be determined that the light beam is focused when FES is zero; the optical disc is further away from the optical disc than when focused when the FES value is a positive value; and the optical disc is nearer to the optical disc than when focused when the FES value is a negative value. It is therefore possible to carry out a reliable focusing servo control by controlling the objective lens driving mechanism (not shown) provided for the objective lens 7 of the optical pickup 100 by feeding back the focus error signal FE, after inverting its sign, such that the FES value becomes zero.

Additionally, the outputs of the aforementioned light receiving elements may be used to calculates a value RF expressed by the following equation (3):

$$RF=A1+A2+B1+B2+C1+C2+D1+D2 \quad (3)$$

to read recording information recorded on the optical disc from this RF signal.

Further, values DPD1, DPD2, DPD3, DPDP4 expressed by the following equations:

$$DPD1=A1+A2 \quad (4)$$

$$DPD2=B1+B2 \quad (5)$$

$$DPD3=C1+C2 \quad (6)$$

$$DPD\$=D1+D2 \quad (7)$$

may be calculated by a comparator/detector for comparing the phase. Then, a DPD based tracking servo control can be performed using these signals. In this case, the calculation circuit has the comparator/detector.

In the aforementioned focus error detecting method in the optical pickup 100, since light in the first through fourth quadrants within return light is divided into the quadrants at diagonal positions, no interference is found among the quadrants on the respective light receiving elements. For this reason, even if an optical disc is not consistent in thickness and includes a thickness error at some locations, no light will leak among the quadrants, and therefore, no error will be produced in the DPD tracking error signal. Since the light beams are separated into the respective quadrants on the respective light receiving elements at a higher degree, a deterioration in the DPD tracking error signal due to a shifted optical axis of a light receiving element can be prevented to some degree. Also, a combination with the three-beam method can be performed without hinderance.

Figure 14:
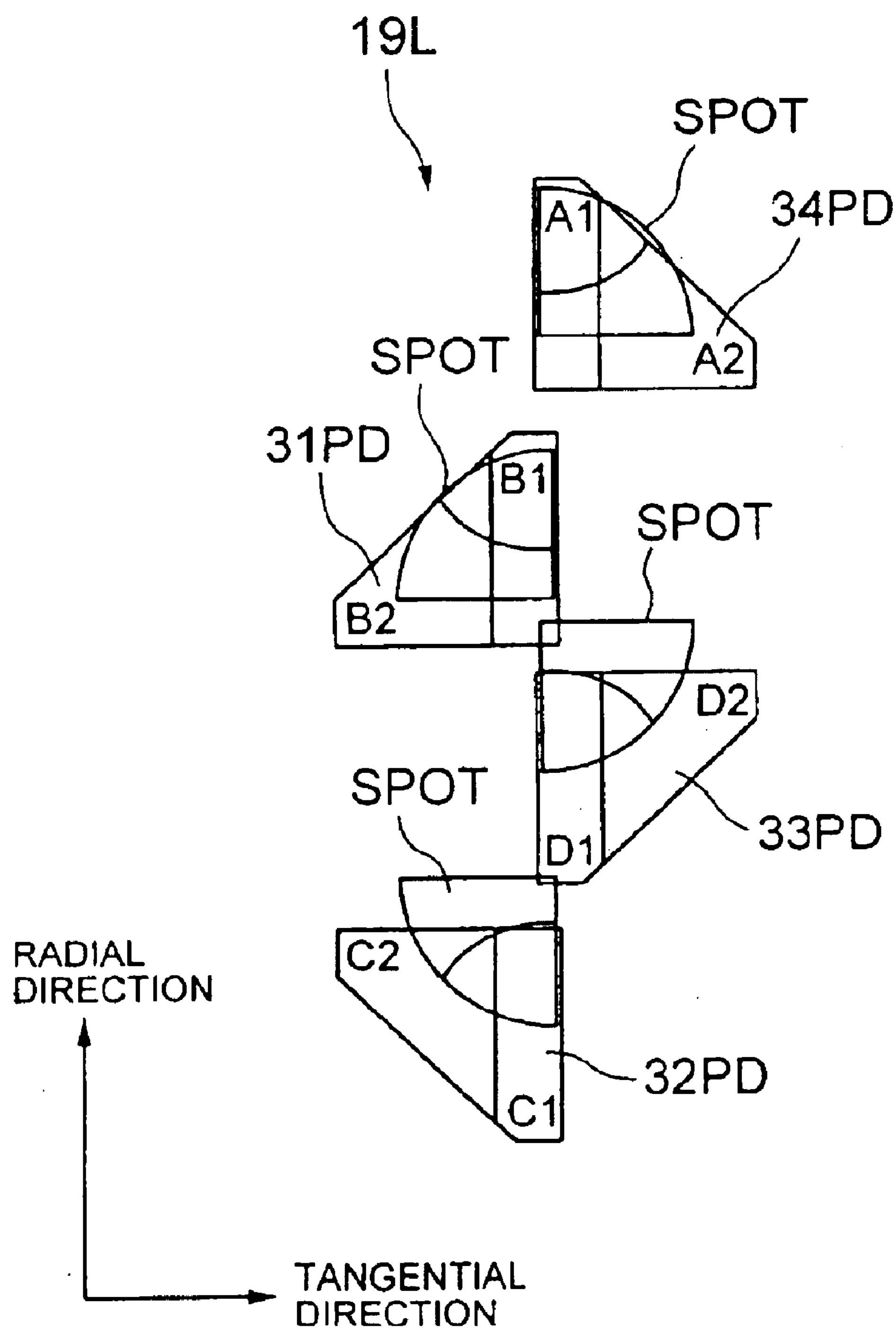

Further, since the bisect lines of the light receiving elements are set to extend in the radial directions, light beam spot images move along the bisect line 60, as illustrated in FIG. 14, so that no influence is exerted even if the optical axis is shifted in the radial direction of the photodetector 19 or an adjustment is erroneous.

On the other hand, as described above, conventional focus error detecting methods such as the spot-size method and four-division detector astigmatic method, a defocused light beam spreads about the optical axis, so that it will not largely extend off light receiving elements. Therefore, when a multi-layer disc is reproduced in accordance with such a conventional focus error detecting method, the influence of interlayer crosstalk cannot be suppressed unless the areas of the light receiving elements are extremely reduced. However, the reduction in the areas of the light receiving elements results in a smaller capture range. In this respect, the focus error detecting method according to the present invention is advantageous in that light beams on the light receiving elements are shaped into linear images at both ends of the capture range, so that light beams out of the capture range largely extend off the light receiving elements. In the focus error detecting method according to the present invention, the amount of introduced defocused light beam is reduced at an early stage, so that the interlayer crosstalk can be suppressed even when reproducing a multi-layer disc which has a narrow layer spacing.

However, in the focus error detecting method according to the present invention, the areas of the light receiving elements are set slightly larger in consideration of a shifted optical axis and so on. For this reason, a defocused light beam will remain in the light receiving elements, thereby hindering the advantage provided by the focus error detecting method according to the present invention. To solve this problem, the spacing between the light receiving elements is considered to prevent a defocused light beam from leaking into other light receiving elements, not only for the multi-layer disc.

In each of the light receiving elements for receiving return light which has been applied with astigmatism and divided into four, the size of the light receiving element is set to a size substantially equal to a spot in the capture range (the size tangential to the longitudinal side near the contour line of the line image spot illustrated in FIGS. 13B, 13D). Specifically, each light receiving element is set such that the positions of the contour lines PL1, PL2 of the light receiving element corresponding to the division lines L1, L2 on the minimum spattered light image plane by the astigmatism do not overlap with a spot out of the capture range. In this way, a defocused light beam completely extends off the light receiving element, thereby eliminating the interlayer crosstalk.

Further, when a spacing d between the contour lines PL1 of the light receiving elements in the column 19L illustrated in FIG. 12 is set to satisfy the following equation (8):

$$d \geq NAc\left(\frac{2t}{n} + CR\right)\beta^2$$

d: Spacing between light receiving elements;

NAc: Numerical aperture of the detection optical system;

t: Interlayer thickness;

n: Diffraction index of layers;

CR: Capture range;

β: Magnification of the detection optical system the interlayer crosstalk can be eliminated within a particular interlayer spacing (t) of a multi-layer disc.

(Reduction in Track Traverse Noise)

The inventors have investigated on noise components caused by astigmatism at an angle of 45° which occurs when a light spot traverses lands and grooves in an optical pickup device for reproducing a signal from an optical disc having grooves and lands formed on an information recording surface thereof using an astigmatic method, in which a focus error signal is generated from a quadrant photodetector.

Figure 15:
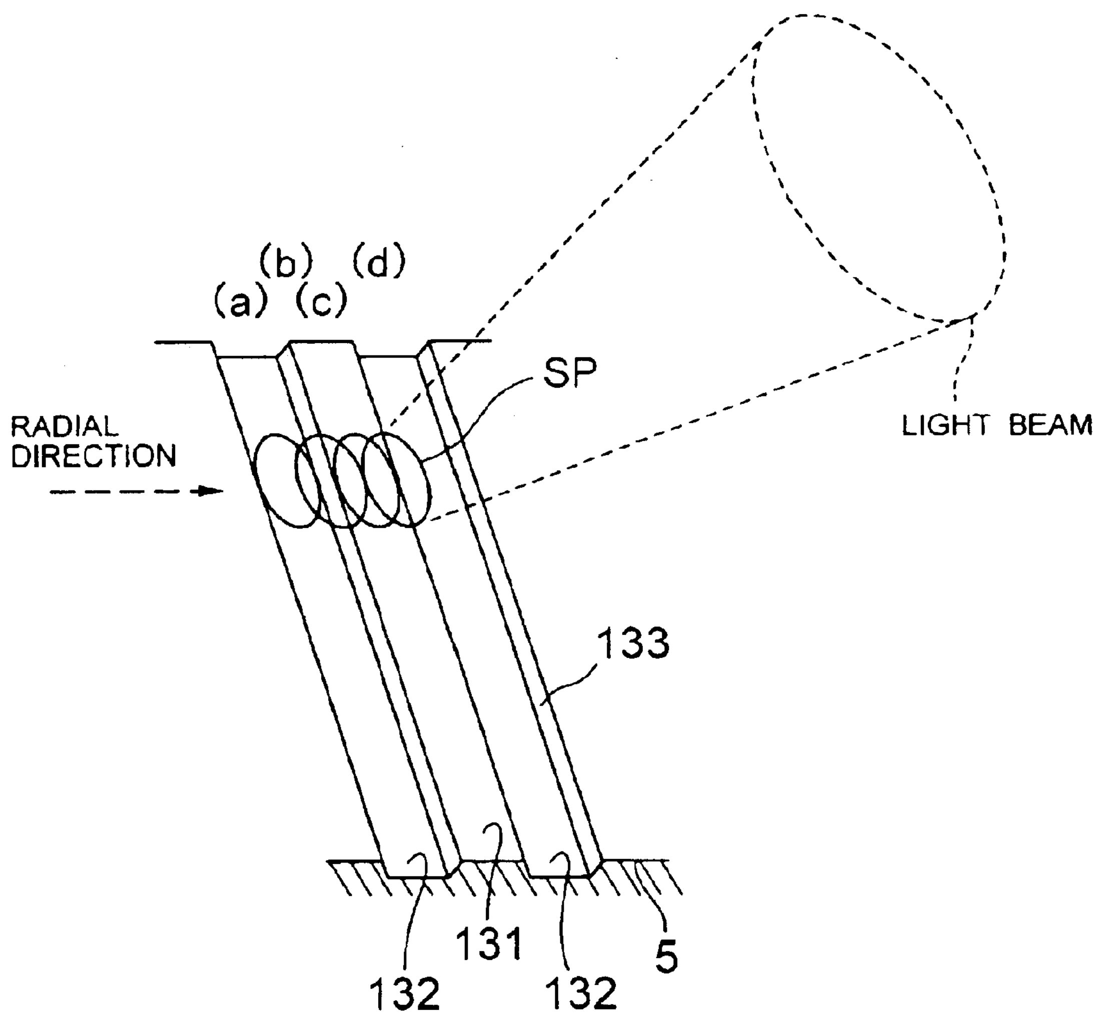
FIG. 15 is a diagram for explaining track traverse noise in the pickup of the present invention.

First as illustrated in FIG. 15, a light beam is irradiated by an irradiation optical system to form a light spot SP on lands 31 and grooves 32 formed spirally or concentrically on an information recording surface of an optical disc 5. The light spot SP is radially moved from (a) to (d) as indicated by a broken line arrow to examine noise introduced into a focus error signal when the light spot traverses the track. It should be noted that the so-called oblique astigmatism component at an angle of 45° remains in the irradiation optical system of the pickup, and a DVD-RAM optical disc based on a disc substrate made of polycarbonate (PC) is used. The grooves and lands on the optical disc 5 are equal in width.

Figures 16A, 16B, 16C, 16D:
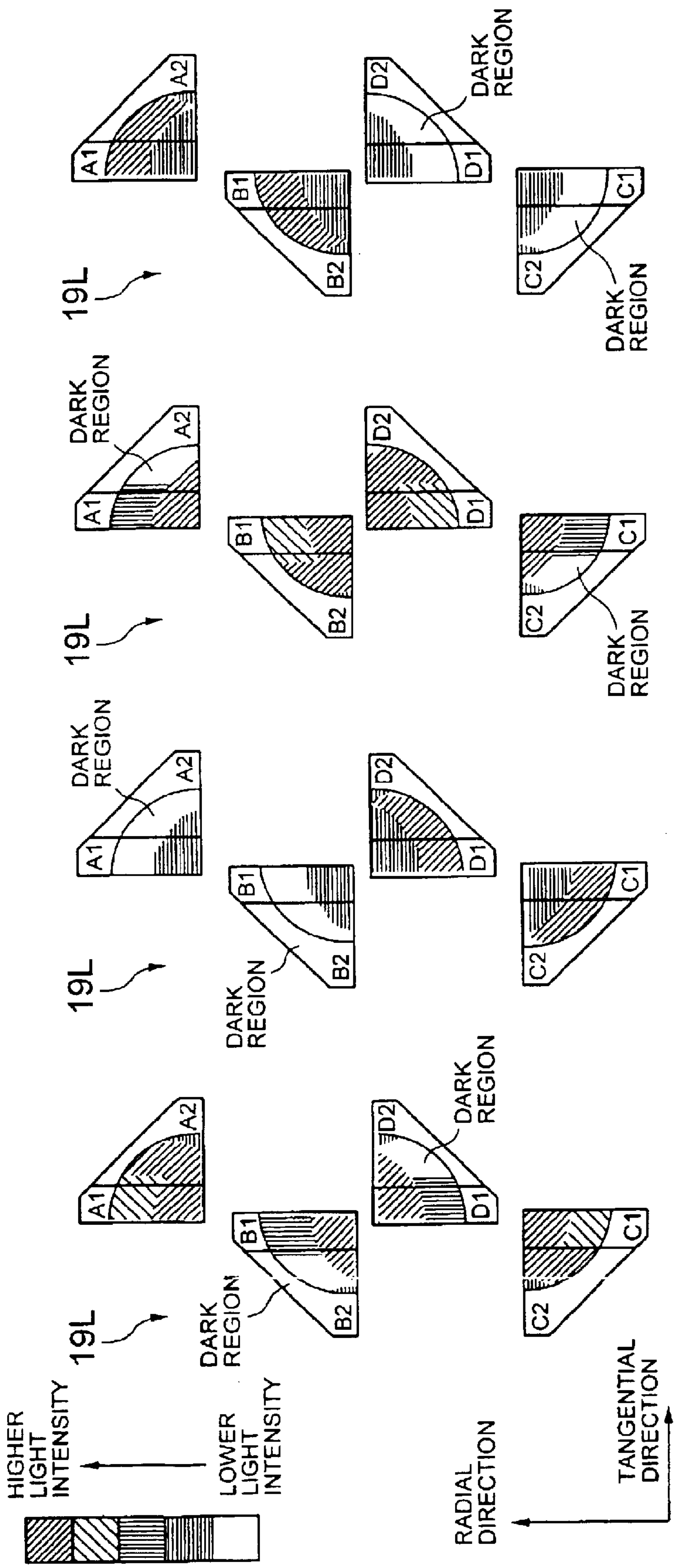

FIGS. 16A–16E each show a light spot intensity distribution mapped on a light receiving surface of a quadrant photodetector 9 when a light spot SP, which is in the shape of true circle when focused, is at a position (a)–(d) indicated in FIG. 15. Near the center of the groove 132, the light spot intensity distribution is as shown in FIG. 16A, wherein dark regions are produced in B2, D2. Further, as the light spot SP is moved to pass near a taper 133 on the boundary of a groove and a land, the optical light spot intensity distribution is as shown in FIG. 16B, where dark regions are produced in A2, B2. Further, as the light spot SP is moved to the vicinity of the center of the land 131, the light spot intensity distribution is as shown in FIG. 16C, where dark regions are produced in A2, C2. Further, as the light spot SP is moved to pass near a taper on he boundary of a land and a groove, the light spot intensity distribution is as shown in FIG. 16D, where dark regions are produced in C2, D2. However, as is apparent from the aforementioned equation for calculating the focus error signal, the dark regions are canceled on the output. It is therefore possible to substantially eliminate the influence of the track traverse noise on the focus error signal.

When a conventional quadrant detector is used, FES=0 should stand when focused. However, the astigmatism at an angle of 45° to the track (tangential) direction causes the generation of a track cross signal which exhibits a maximum and a minimum in the states shown in FIGS. 16A, 16C, respectively, thereby preventing FES from being zero. The track cross signal which repeats the maximum and minimum on grooves and lands constitutes noise in FES, which however is eliminated by the present invention.

(Other Embodiments)

Figure 17:
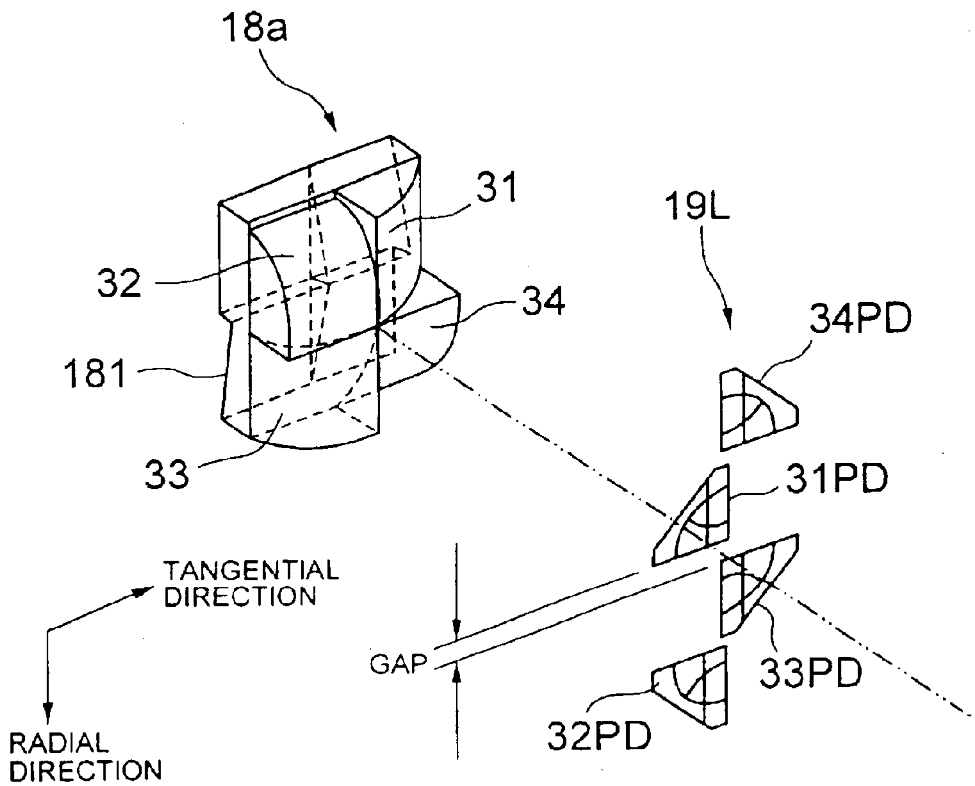
FIGS. 17 through 21 are perspective views for explaining the focus error detecting optical element in the optical pickup of the present invention.
Figure 18:
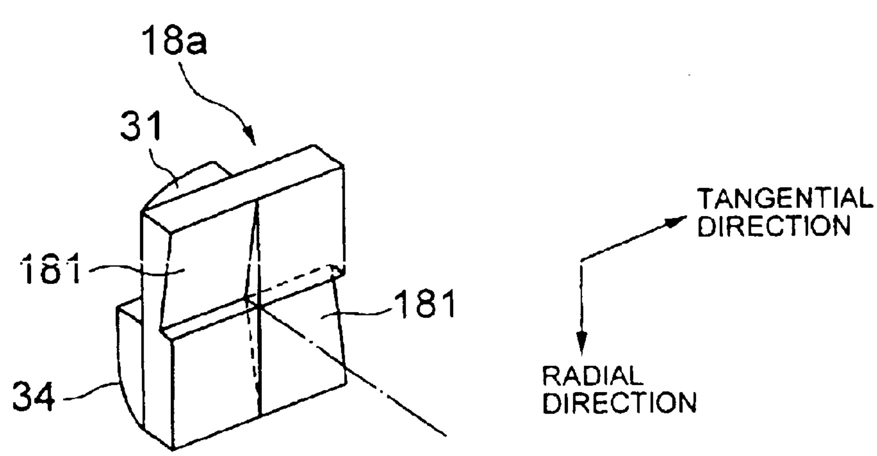

A second embodiment is identical to the foregoing embodiment except that a focus error detecting optical element 18*a* illustrated in FIGS. 17, 18 is employed in place of the focus error detecting optical element 18 illustrated in FIG. 7 of the foregoing embodiment. The focus error detecting optical element 18*a* is identical to the focus error detecting optical element 18 illustrated in FIG. 7 except that the element 18*a* includes deflecting prism surfaces 181, on the input side of the first and third lens sections 31, 33 on the first and third quadrants, which are tilted at different angles to planes perpendicular to the optical paths of return light. In this embodiment, a gap GAP can be set between the first light receiving element 31PD and the third light receiving element 33PD in the photodetector 19 by adjusting the angles of the deflecting prism surfaces 181 tilted from a plane including the division line L1 and the optical axes symmetrically to that plane.

Figure 19:
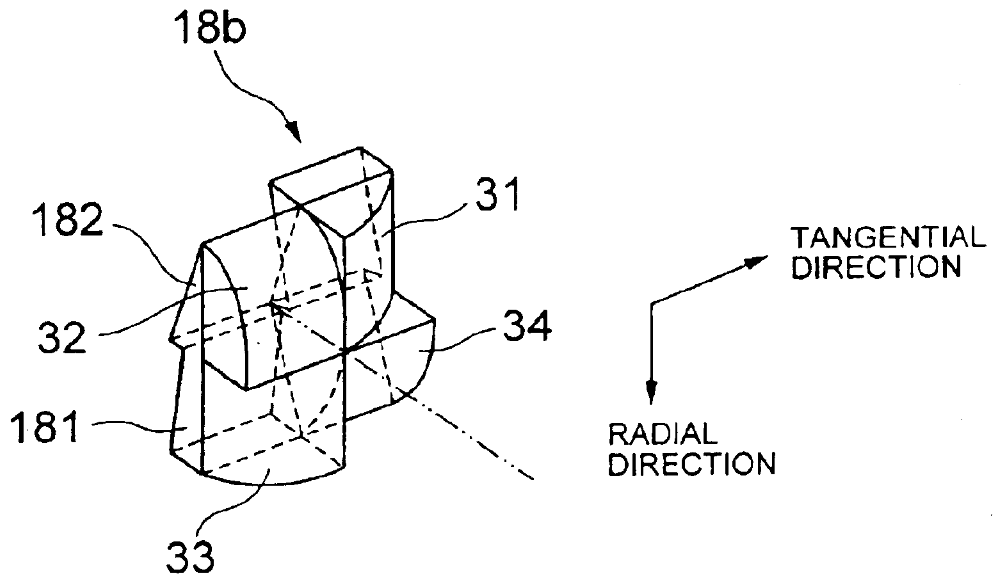
Figure 20:
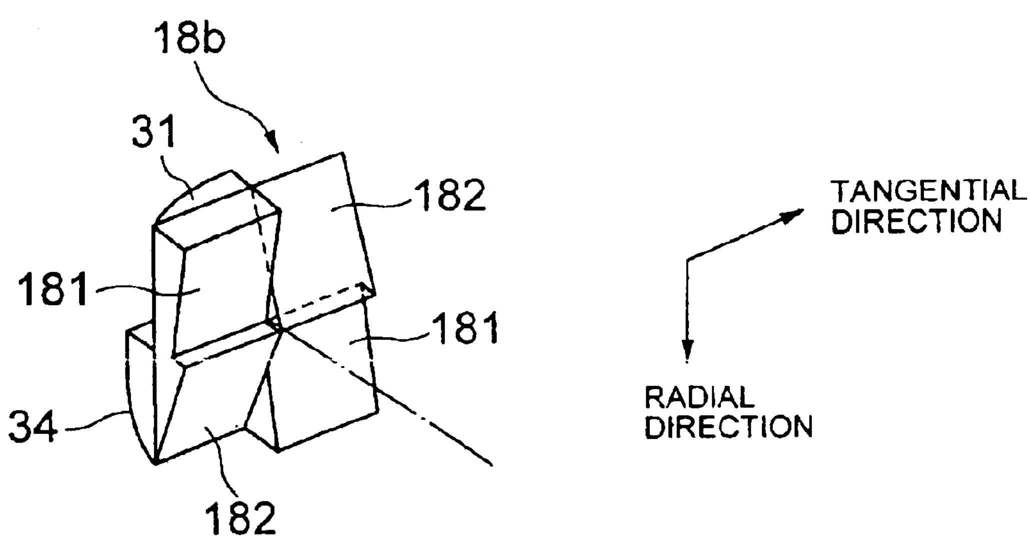

FIGS. 19, 20 illustrate a focus error detecting optical element 18*b* according to a third embodiment. Likewise, the third embodiment is identical to the first embodiment except that the focus error detecting optical element 18*b* is employed in place of the focus error detecting optical element 18 illustrated in FIG. 7 of the foregoing embodiment. The focus error detecting optical element 18*b* is identical to the focus error detecting optical element 18*a* illustrated in FIGS. 17, 18 except that deflecting prism surfaces 182 are positioned on the input side of the second and fourth lens sections 32, 34 on the second and fourth quadrants such that they are tilted at second different angles to planes perpendicular to optical paths of return light to define a spacing between the second light receiving element 32PD and the fourth light receiving element 34PD in the photodetector 19. The deflecting prism surfaces 182 thus provided can spatially separate return light for each quadrant without using cylindrical lenses which have offset central axes of the second and fourth lens sections 32, 34. Also, in the third embodiment, the spacings and positions of the first through fourth light receiving elements 31DP–34PD in the photodetector 19 can be arbitrarily set by adjusting the angles of the deflecting prism surfaces 181, 182 which are tilted symmetrically or asymmetrically from the plane including the division line and the optical axis.

Figure 21:
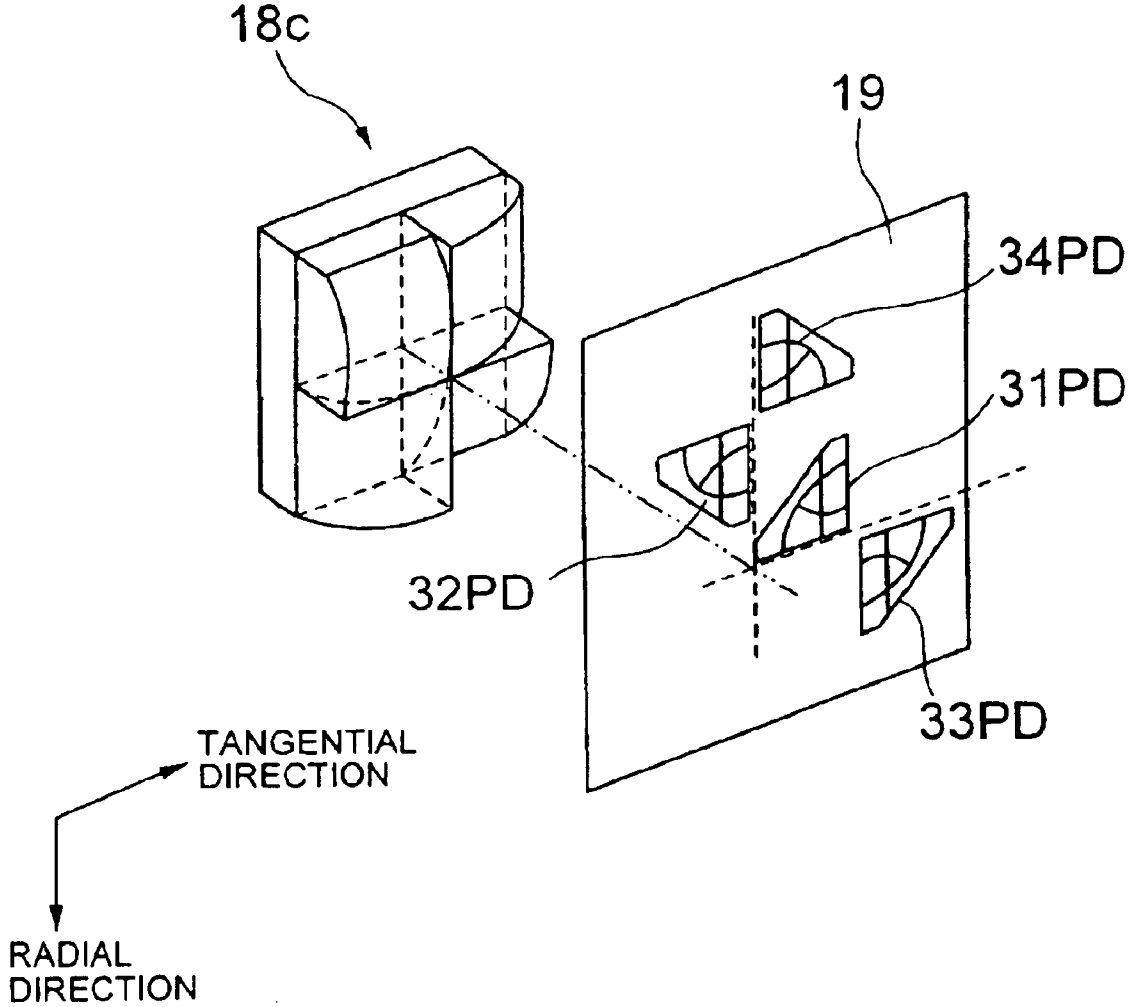

The third embodiment employs the focus error detecting optical element which can combine the deflecting prism surfaces with the offset cylindrical lens. Alternatively, a fourth embodiment employs a focus error detecting optical element 18*c* which uses offset cylindrical lenses for all of first through fourth lens sections 31–34, as illustrated in FIG. 21. The focus error detecting optical element 18c comprises a first and a third lens section 31*c*, 33*c* both having the central axes offset from the division line L2 to the first and fourth quadrants, and a second and a fourth lens section 32*c*, 34*c* both having the central axes offset from the division line L1 to the first and second quadrants.

Also, as illustrated in FIG. 21, since the center of each light spot image irradiated onto the minimum scattered circle image place moves with respect to the essential optical axis of the light beam before incident on the focus error detecting optical element 18*c*, a column 19L comprised of the first through fourth light receiving elements 31DP–34PD of the photodetector 19 are oriented obliquely with respect to the division lines. FIG. 22 shows how the spot shape changes on the oblique light receiving element column 19L when the focus position of the objective lens of the optical pickup 100 changes. Specifically, FIG. 22A shows a spot shape when the light beam is focused on the information recording surface of an optical disc; FIG. 22B shows a spot shape when the light beam is not focused and the objective lens is further away from the optical disc than when the light beam is focused; FIG. 22C shows a spot shape when the light beam is not focused and the objective lens is yet further away from the optical disc beyond the capture range; FIG. 22D shows a spot shape when the light beam is not focused and the objective lens is nearer to the optical disc than when the light beam is focused; and FIG. 22E shows a beam spot when the light beam is nod focused and the objective lens is further nearer to the optical disc beyond the capture range. FIGS. 22A–22E substantially correspond to the spots (a)–(e) in FIG. 11. As is apparent from FIGS. 22A–22E, each of the first through fourth light receiving elements 31PD–34PD substantially has the shape of triangle formed of perpendicular contour lines corresponding to the division line, in accordance with the shape of the spot when the light beam is focused, so that a margin is ensured for spaced elements even if a spot extends off the capture range (FIGS. 22C, 22E), thereby preventing extra light from leaking into adjacent light receiving elements.

(Detection of Capture Range)

Figure 23:
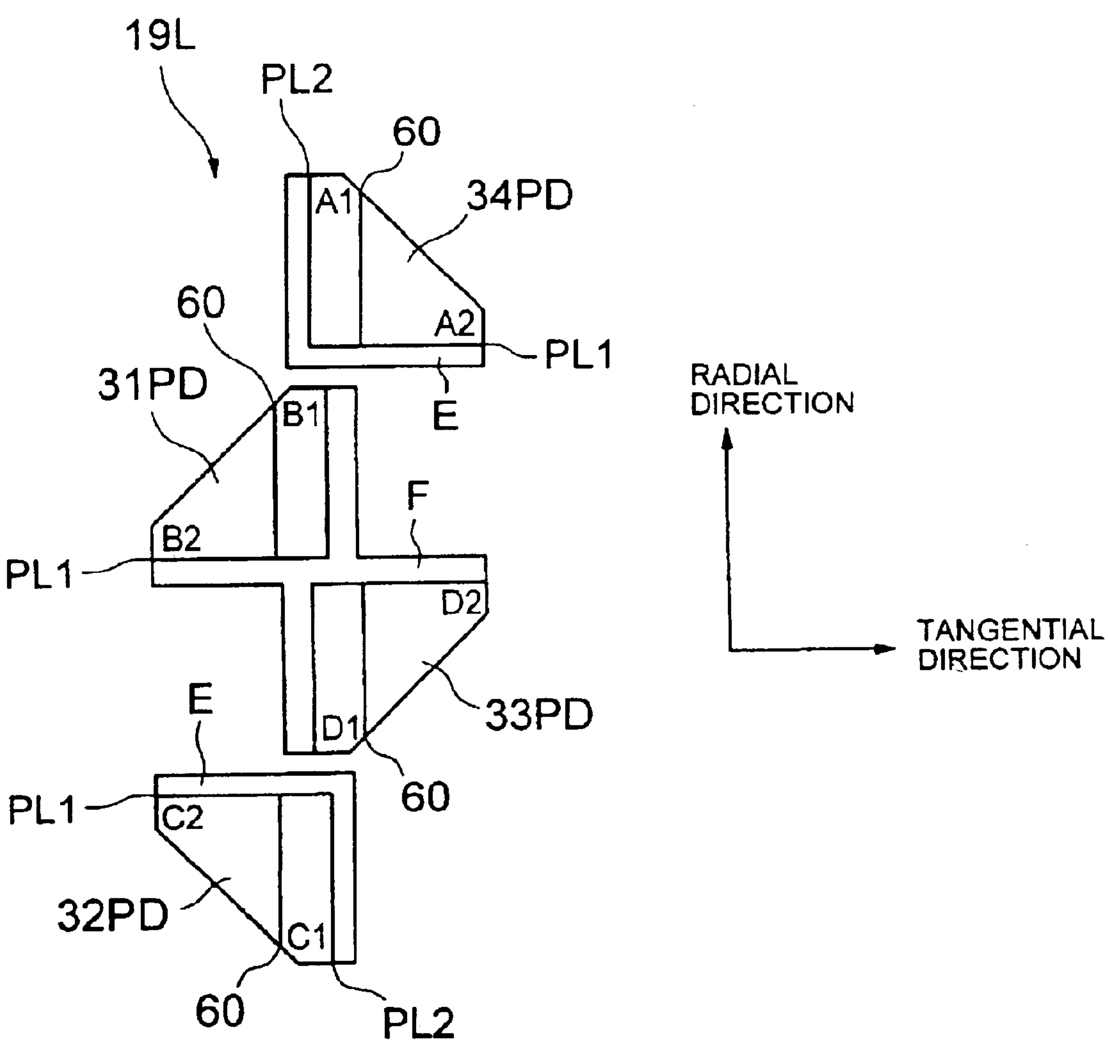

A fifth embodiment comprises a light receiving element for detecting the capture range in addition to the foregoing first through fourth embodiments. Specifically, in a photodetector 19, auxiliary light receiving elements E, F are disposed along contour lines PL1, PL2 (corresponding to the division lines L1, L2 ) of the first through fourth light receiving elements 31PD–34PD for receiving return light out of the capture range, as illustrated in FIG. 23. The auxiliary light receiving elements F associated with the first and third light receiving elements 31PD, 33PD can be integrated as illustrated in FIG. 23.

As illustrated in FIG. 24 (corresponding to FIG. 13), when a light beam is shifted from a focal point (FIG. 24A) on an optical disc (FIGS. 24B, 24D), light spots on the first through fourth light receiving elements are shaped into line images by the action of astigmatism applied thereto. This position indicates the capture range (peak of the sigmoid characteristic curve). As the objective lens is displaced beyond the capture range and away from the focal point, the light spots shaped into line images move to the opposite sides with respect to the line images (contour lines) (FIGS. 24C, 24E). Since the auxiliary light receiving elements E, F for detecting the capture range are positioned in that region, a capture range detector circuit connected to the auxiliary light receiving elements E, F can suddenly sense a signal indicative of the peak of the sigmoid characteristic.

The capture range detector circuit can be configured such that the calculating circuit calculates a capture range detection signal CR expressed by the following equation (8a) when the signs of the auxiliary light receiving elements (E, F) are indicated as their outputs:

$$CR=F+E \tag{8a}$$

This calculation can be made by a calculating circuit for calculating the sum of signals output from the auxiliary light receiving elements by return light from the two sets of quadrant areas existing at diagonal positions in the first through fourth quadrants.

Also, the capture range detector circuit can be configured such that the calculating circuit calculates a focus error signal FES expressed by the following equation (9) when the signs of the light receiving areas (B1, B2), (C1, C2), (D1, D2), (A1, A2) of the first light receiving elements 31PD–34PD and the auxiliary light receiving elements (E,F) are indicated as their outputs:

$$FES=(A1+B2+C1+D2+F)-(A2+B1+C2+D1+E) \tag{9}$$

Figure 25:
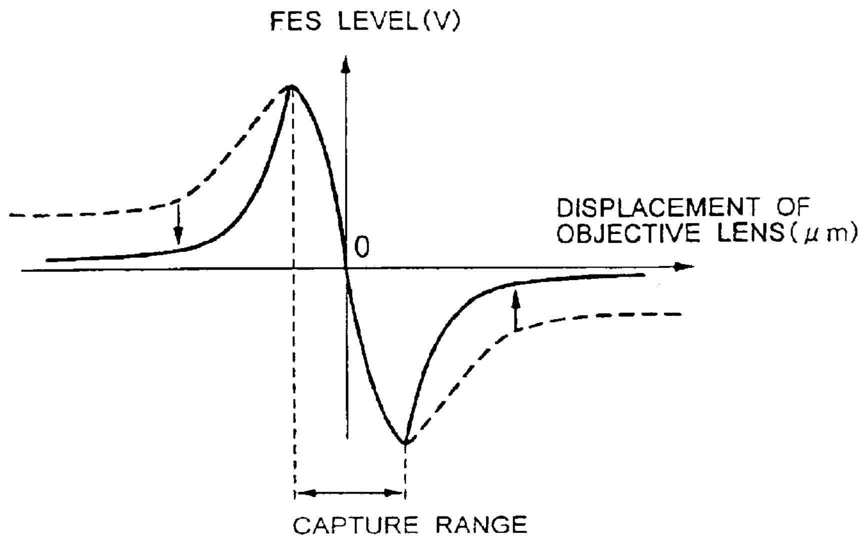
FIG. 25 is a graph showing the focus error signal characteristic provided by the optical pickup of the present invention.
Figure 26:
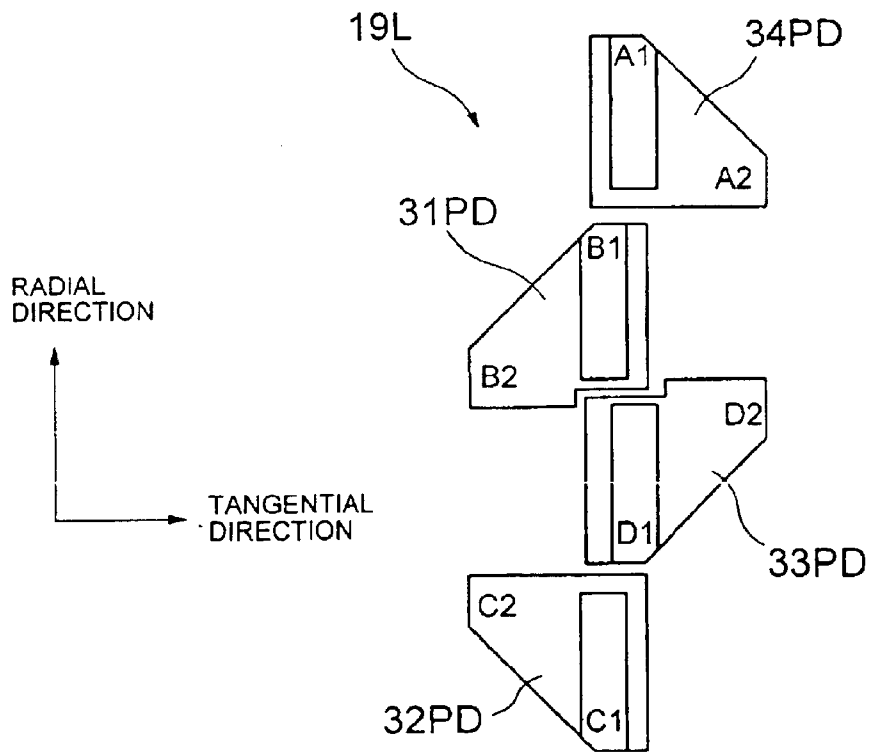
FIGS. 26 and 27 are plan views for explaining the action of the optical detector in the optical pickup of the present invention.

This calculation can be made by providing a capture range calculating circuit which adds a difference between the signals E, F output from the auxiliary light receiving elements, generated by return light out of the capture range, to the sum of differences of signals output from the light receiving areas. In other words, by subtracting the signal generated from the signals sensed by the auxiliary light receiving elements E, F from a focus error, the focus error signal FES can be suddenly brought close to zero when the light beam is defocused out of the capture range, as illustrated in FIG. 25. In this way, it is also possible to prevent an offset of the focus error signal on a multi-layer disc or the like such as DVD which has a plurality of information recording surfaces stacked in the film thickness direction.

Further, in a sixth embodiment, the auxiliary light receiving element E in the fourth light receiving element 34PD is integrated into the light receiving area A1 on the opposite side of the contour line PL2; the auxiliary light receiving element F in the first light receiving element 31PD is integrated into the light receiving area B2 on the opposite side of the contour line PL2; the auxiliary light receiving element F in the third light receiving element 33PD is integrated into the light receiving area D2 on the opposite side of the contour line PL2; and the auxiliary light receiving element E in the second light receiving element 32PD is integrated into the light receiving element C2 on the opposite side of the contour line PL2.

The configuration illustrated in FIG. 23 requires an auxiliary light receiving element provided for each light receiving element, causing an increased number of terminals through which signals are extracted from the auxiliary light receiving elements, and a complicated calculation. To solve this problem, the auxiliary light receiving elements for detecting the capture range are integrated with portions of the light receiving elements for finding a focus error for simplification. Although the capture range detection signal includes an extra output from light receiving areas which is essentially unnecessary, no problem arises therefrom since no light spot exists originally in such light receiving areas. Also, a calculation for bringing the focus error close to zero when the light beam is defocused out of the capture range does not particularly require an external calculating circuit. The capture range detection signal CR can be calculated as expressed by the following equation (10):

$$CR=A2+B2+C2+D2 \quad (10)$$

Figure 27:
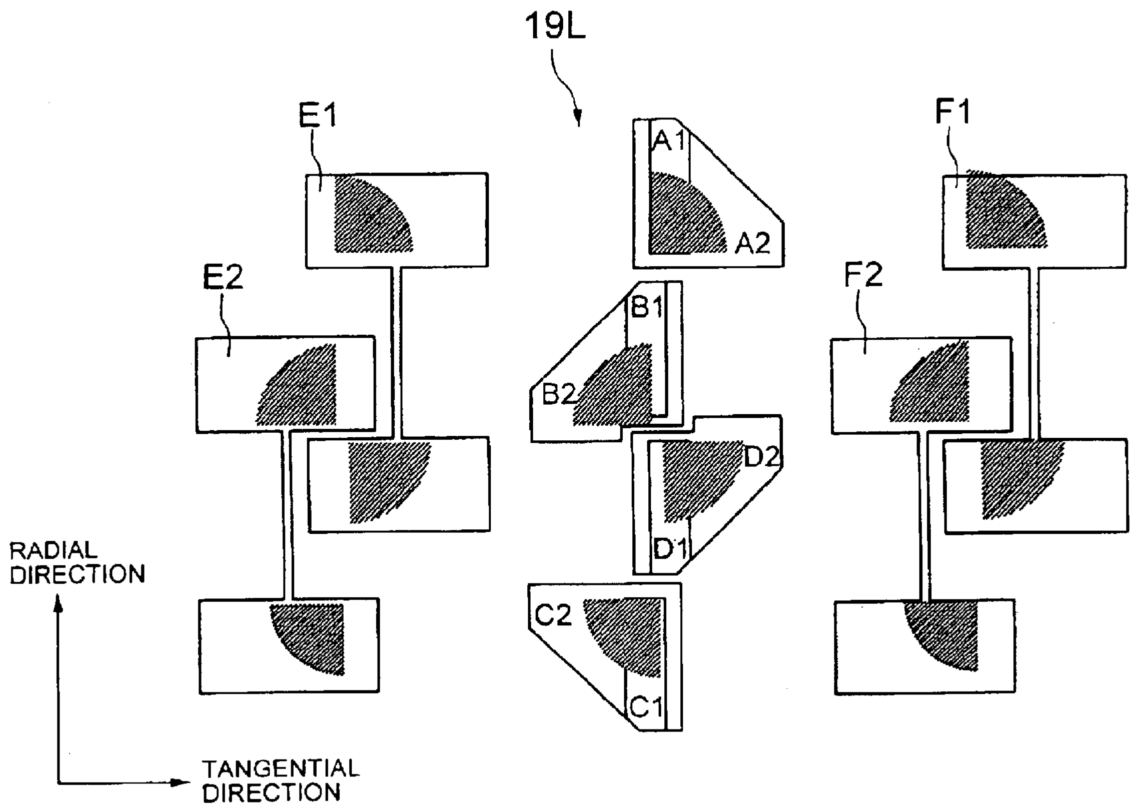

FIG. 27 illustrates a seventh embodiment which comprises a pair of three-beam sub-photodetectors for a differential push-pull (DPP) method, by way of example.

Alternatively, on both sides of the column 19L comprised of the first through fourth light receiving elements 31PD–34PD for detecting the capture range, a first pair of sub-photodetectors E1, E2 and a second pair of sub-photodetectors F1, F2 may be disposed for generating total received light outputs on the same sides with respect to the division line L2, as illustrated in FIG. 27, wherein one of the pairs is allocated for a + primary sub-beam, and the other pair for a – primary sub-beam, so that the three-beam method can also be supported. In this event, a differential push-pull signal DPP and provisional signals SubRFl, SubRF2 can be calculated as expressed by the following equation (11):

$$DPP=(E1+F1-E2-F2)+(A1+A2+D1+D2-B1-B2-C1-C2)$$

$$SubRF1=E1+E2$$

$$SubRF2=F1+F2 \quad (11)$$

Since the present invention employs the auxiliary light receiving elements which can correctly detect the capture range to generate the capture range signal, it is possible to prevent the objective lens from colliding due to a shift in focus in a pickup which uses an objective lens having a very small operation distance.

Also, since the focus error signal can be suddenly brought close to zero by subtracting a signal generated by the detectors for detecting the capture range from the focus error signal generated when the light beam is defocused out of the capture range, the focus error signal is free from an offset when a multi-layer disc or the like is reproduced.

(Correction of Focus Error Signal)

Figure 28:
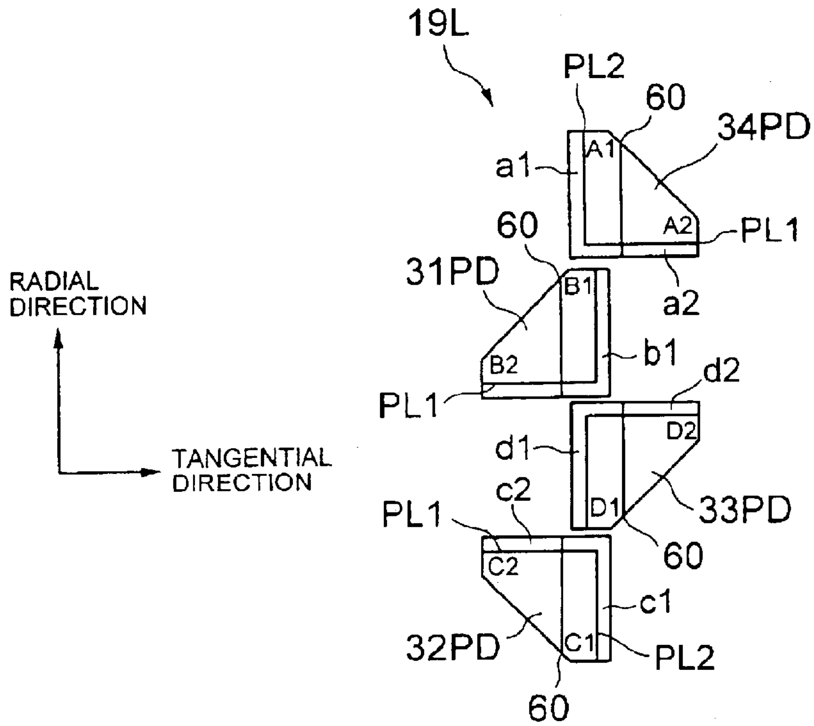

A further embodiment of the present invention comprises an auxiliary light receiving element for correcting the focus error signal in addition to the optical elements for detecting the focus error. Specifically, as illustrated in FIG. 28, a photodetector 19 comprises pairs of auxiliary light receiving elements (a1, a2), (b1, b2), (c1, c2), (d1, d2) for receiving return light positioned along contour lines PL1, PL2 (corresponding to the division lines L1, L2) of first through fourth light receiving elements 31PD–34PD. An auxiliary light receiving element is positioned adjacent to each light receiving area, and as illustrated in FIG. 28, the pairs of auxiliary light receiving elements (a1, a2), (b1, b2), (c1, c2), (dig d2) are corresponded to pairs of light receiving areas (A1, A2), (B1, B2), (C1, C2), (D1, D2), respectively.

Figure 29:
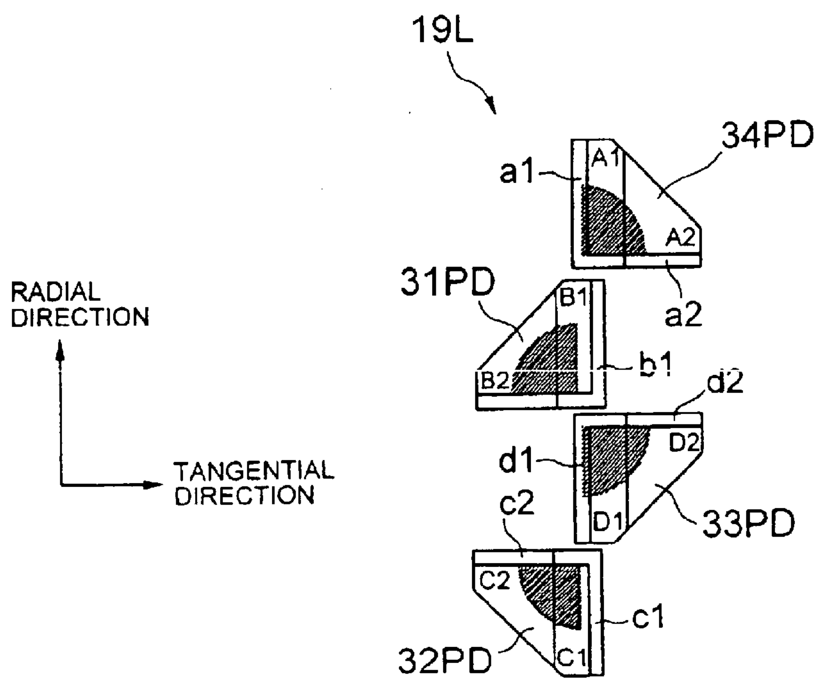
Figure 30A:
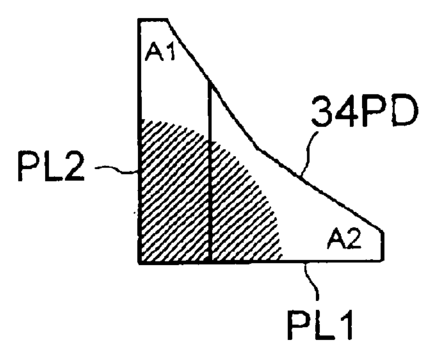
Figure 30B:
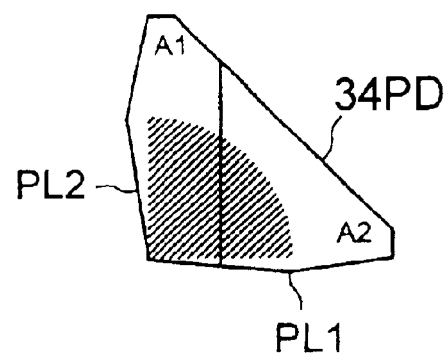
Figure 30C:
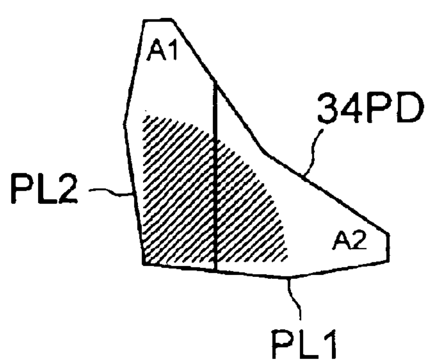
Figure 30D:
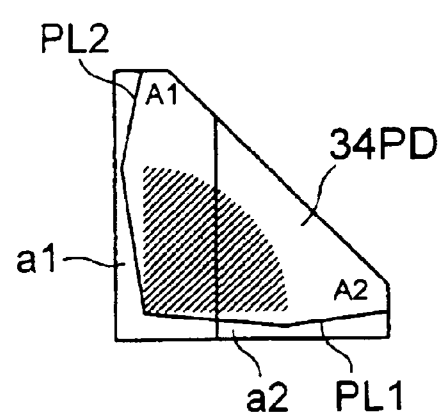

As illustrated in FIG. 29, if the optical spot is offset in the tangential direction even when it is focused, i.e., if the optical axis is shifted, a portion of light spot falling outside the light receiving elements is received by the auxiliary light receiving elements, so that the focus error signal FES can be properly generated. Also, since the signals from the auxiliary light receiving elements are not used for generating the RF signal, a defocused spot can be prevented from leaking into the RF signal. In other words, the interlayer crosstalk can be suppressed on a multi-layer disc. A similar effect can be produced even if a focused light spot is displaced in a radial direction and the optical axis is shifted.

The photodetector 19 can be configured such that the calculating circuit calculates a corrected focus error signal FES expressed by the following equation (12) when the signs of the light receiving areas (B1, B2), (C1, C2), (D1, D2), (A1, A2) of the first through fourth light receiving elements 31PD–34PD, and the auxiliary light receiving elements (b1, b2), (c1, c2), (d1, d2), (a1, a2) are indicated as their outputs:

$$FES=(A1+B2+C1+D2+a1+b2+c1+d2)-(A2+B1+C2+D1+a2+b1+c2+d1) \quad (12)$$

This calculation can be implemented by providing a focus error signal correction calculating circuit which generates a focus error signal that is corrected by adding the sum of differences of signals output form pairs of corresponding auxiliary light receiving elements to the sum of differences of signals output from two light receiving areas of the respective light receiving elements. In other words, an offset in the focus error signal can also be prevented in a multi-layer disc or the like by subtracting a difference signal generated from signals sensed by the auxiliary light receiving elements (a1, a2), (b1, b2), (c1, c2), (d1, d2) from the focus error signal.

FIG. 30 illustrates an embodiment in which the shape of the light receiving elements is modified in the foregoing embodiments. As illustrated in FIG. 30A, a contour line opposing contour lines PL1, PS2 corresponding to division lines of a light receiving element substantially in the shape of right rectangle is recessed toward the contour lines PL1, PL2 to reduce the area of the light receiving element to an area minimally required for generating a focus error signal. As illustrated in FIG. 30B, contour lines PL1, PL2 corresponding to division lines of a light receiving element substantially in the shape of right rectangle are bowed outward in the normal directions of the contours to prevent an outer peripheral portion of a light beam spot including high range components of an RF reproduced signal from leaking from the light receiving element. As illustrated in FIG. 30C, a light receiving element is shaped into a combination of the structures illustrated in FIGS. 30A, 30B to limit an increase in area. As illustrated in FIG. 30D, the light receiving element of the structure illustrated in FIG. 30C is provided with an auxiliary light receiving element disposed along the convex contour lines to prevent an outer peripheral portion of a light beam spot including high range components of an RF reproduced signal from leaking from the light receiving element.

While the foregoing embodiments have been described with a lens element produced by combining cylindrical lenses as an example of the focus error detecting optical element, the present invention is not limited to this example, and may use a focus error detecting optical element in another structure, for example, a blazed quadrant hologram element having similar functions. In essence, in an optical pickup having an irradiation optical system for focusing a light beam to form a spot on a track on an information recording surface of an optical recording medium, and a light detection optical system for leading return light reflected back from the spot to a photodetector, and having a focus error detecting optical element having an area quadrisected into first through fourth quadrants from the center of an optical path of the return light along two division lines extending corresponding to a direction in which the track extends and a direction perpendicular to the extending direction on a plane substantially perpendicular to the optical path of the return light, for applying the return light passing through adjacent ones of the areas on the same side of the division line with astigmatism in directions rotated by 90° from each other about the optical path, and for separating the return light into at least four corresponding to the areas, and a photodetector having a plurality of spaced light receiving elements for receiving the separated return light, each of the light receiving elements having contour lines corresponding to the division lines on an image plane on which a light beam is shaped into a circular beam in the optical system in which the astigmatism is applied, and comprised of two light receiving areas divided by a bisect line extending substantially in parallel with one of the contour lines, a focus error signal may be generated from the sum of differences of signals output from the two light receiving areas.

Also, while in the foregoing embodiments, the focus error detection optical system 18 is positioned in front of the photodetector 19 as illustrated in FIG. 6, a polarizing lens element having similar functions to the focus error detecting optical element 18 and also having a polarizing action may be provided between the mirror 25 and the quarter wavelength plate 6.

As described above, the optical pickup device according to the present invention comprises the focus error detecting optical element which divides return light from an optical disc into four optical paths and applying predetermined astigmatism to the light on each divided optical path, and the photodetector comprised of a plurality of bisected light receiving elements which are spaced apart from each other, so that the optical pickup device is less susceptible to track traverse noise and error in thickness of optical disc, permits a combined use with a three-beam method or a DPD method, provides highly sensitive detection of a defocused state, and can reduce the size thereof. Thus, the present invention provides an optical pickup which is less susceptible to track traverse noise and error in thickness of optical disc, permits a combined use with a three-beam method or a DPD method, provides highly sensitive detection of a defocused state, and is invulnerable to a shifted optical axis.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention Thus, it should be appreciated that the invention is not limited to the disclosed embodiments but may be practiced within the full scope of the appended claims.

This application is based on Japanese Patent Applications Nos. 2000-272090 and 2000-272091 which are hereby incorporated by reference.

What is claimed is:

1. An optical pickup device for detecting a focus error of a light beam, having an irradiation optical system for focusing the light beam to form a spot on a track extending in an information recording surface of an optical recording medium, and a light detection optical system for leading return light reflected back from the spot to a photodetector, said optical pickup device comprising:

a focus error detecting optical element having four sections of first through fourth quadrants quadrisected around the center of an optical path of the return light along two division lines extending corresponding to a track extending direction and a direction perpendicular to the track extending direction respectively, the four sections disposed on a plane substantially perpendicular to the optical path of the return light, wherein the four sections provide astigmatism for the return light passing through the sections contiguous to said division lines so that the astigmatism in directions are rotated by 90° from each other about the optical path, while separating the return light into at least four paths; and a photodetector which has at least four spaced light receiving elements for receiving the separated return light each of which has contour lines corresponding to said division lines and is comprised of two light receiving areas divided by a bisect line extending substantially in parallel with one of the contour lines, wherein said bisect line of said spaced light receiving element extends corresponding to the direction perpendicular to the track extending direction.

2. The optical pickup device according to claim 1, wherein the focus error detecting optical element is a blazed quadrant hologram element.

3. The optical pickup device according to claim 1, wherein each of the four spaced light receiving elements is divided by the bisect line so that signals output from two light receiving areas of each spaced light receiving element are substantially equal in a condition that focused spots of the return light are received on said spaced light receiving elements as a minimum scattered circular image.

4. The optical pickup device according to claim 1, further comprising a calculating circuit connected to said spaced light receiving elements for generating a focus error signal from the sum of differences of signals output from two light receiving areas of said spaced light receiving elements.

5. The optical pickup device according to claim 1, further comprising auxiliary light receiving elements for receiving the return light out of two line image ranges caused by the astigmatism, said auxiliary light receiving elements positioned along the contour line corresponding to the bisect line of said spaced light receiving element.

6. The optical pickup device according to claim 5, further comprising a calculating circuit connected to said auxiliary light receiving elements for calculating the sum of signals output from said auxiliary light receiving elements generated by the return light returned from a pair of the sections existing at diagonal positions in said first through fourth quadrants.

7. The optical pickup device according to claim 5, further comprising a capture range calculating circuit connected to said spaced light receiving element and said auxiliary light receiving elements for adding the sum of signals output from said auxiliary light receiving elements generated by the return light from two sections existing at diagonal positions in said first through fourth quadrants to the sum of differences of outputs from two light receiving areas of said spaced light receiving elements.

8. The optical pickup device according to claim 5, wherein said auxiliary light receiving elements are integrated into said light receiving areas on the opposite side of said contour line corresponding to said division line of said spaced light receiving elements.

9. The optical pickup device according to claim 1, wherein said focus error detecting optical element includes:

cylindrical lenses of one pair of the sections existing at diagonal positions in said first through fourth quadrants, and having central axes extending in a direction in which said division line extends; and cylindrical lenses of the other pair of the sections existing at diagonal positions in said first through fourth quadrants, and having central axes extending in a direction at 90° to the direction in which said division line extends, wherein the central axes of cylindrical lenses of at least one pair of the sections existing at diagonal positions in said first through fourth quadrants are offset from said division line in parallel therewith.

10. The optical pickup device according to claim 9, wherein the offset central axes of the cylindrical lenses existing at diagonal positions in said first through fourth quadrants are offset from said division line on opposite sides to each other.

11. The optical pickup device according to claim 10, wherein said focus error detecting optical element further comprises deflecting prism surfaces tilted at different angles to planes vertical to optical paths of the return light and positioned on the opposite sides to the cylindrical lenses other than said offset cylindrical lenses having the offset central axes.

12. The optical pickup device according to claim 9, wherein said spaced light receiving elements are arranged in parallel with one of said division lines of said focus error detecting optical element.

13. The optical pickup device according to claim 12, further comprising:

a diffraction grating disposed in said irradiation optical system; and a pair of sub-photodetectors disposed on one side of a column of said spaced light receiving elements for receiving a + primary diffraction sub-beam and a − primary diffraction sub-beam, respectively, wherein said optical pickup device conducts a tracking control based on a three-beam method.

14. The optical pickup device according to claim 9, further comprising a comparator/detector for detecting a difference in phase of respective sum signals output from two sets of said spaced light receiving elements existing at diagonal positions for independently receiving the return light passing through said four sections of first through fourth quadrants of said focus error detecting optical element, wherein said optical pickup device conducts a tracking control based on a phase difference method.

15. The optical pickup device according to claim 1, wherein:

cylindrical lenses of one pair of the sections existing at diagonal positions in said first through fourth quadrants, and having central axes extending in a direction in which said division line extends; and cylindrical lenses of the other pair of the sections existing at diagonal positions in said first through fourth quadrants, and having central axes extending in a direction at 90° to the direction in which said division line extends, wherein said focus error detecting optical element further comprising deflecting prism surfaces tilted at different angles to planes vertical to optical paths of the return light and positioned on the opposite sides to at least one pair of the cylindrical lenses of the sections existing at diagonal positions in said first through fourth quadrants.

16. The optical pickup device according to claim 15, wherein said deflecting prism surfaces are formed to be tilted at different angles to the places perpendicular to the plane vertical to the optical paths of the return light.

17. The optical pickup device according to claim 16, wherein said deflecting prism surfaces are placed only on the opposite sides to the cylindrical lenses of at least one pair of the sections existing at diagonal positions, and wherein the central axes of cylindrical lenses of the remaining pair of the sections existing at diagonal positions in said first through fourth quadrants are offset from said division line in parallel therewith.

18. The optical pickup device according to claim 1, further comprising auxiliary light receiving elements each disposed adjacent to each of said light receiving areas along said contour line corresponding to said division lines of said spaced light receiving elements.

19. The optical pickup device according to claim 18, further comprising a focus error signal correction calculating circuit connected to said spaced light receiving elements and said auxiliary light receiving elements for adding the sum of differences of signals output from said auxiliary light receiving elements to the sum of differences of signals output from two light receiving areas of said spaced light receiving elements to generate a focus error signal.

20. A focus error detecting method for detecting a focus error in a light beam in an optical pickup device having an irradiation optical system for focusing the light beam to form a spot on a track on an information recording surface of an optical recording medium, and a light detection optical system for leading return light reflected back from the spot to a photodetector, said method comprising the steps of:

using a focus error detecting optical element having four sections of first through fourth quadrants quadrisected around the center of an optical path of the return light along two division lines extending corresponding to a track extending direction and a direction perpendicular to the track extending direction respectively, the four sections disposed on a plane substantially perpendicular to the optical path of the return light, wherein the four sections provide astigmatism for the return light passing through the sections contiguous to said division lines so that the astigmatism in directions are rotated by 90° from each other about the optical path, while separating the return light into at least four paths; and using a photodetector which has at least four spaced light receiving elements for receiving the separated return light each of which has contour lines corresponding to said division lines and is comprised of two light receiving areas divided by a bisect line extending substantially in parallel with one of the contour lines, wherein said bisect line of said spaced light receiving element extends corresponding to the direction perpendicular to the track extending direction.

* * * * *